(12) United States Patent
Tahiliani et al.

(10) Patent No.: US 11,874,665 B2
(45) Date of Patent: Jan. 16, 2024

(54) AREA COVERAGE PLANNER WITH REPLENISHMENT PLANNER

(71) Applicant: Trimble Inc., Sunnyvale, CA (US)

(72) Inventors: Kapil Tahiliani, Alpharetta, GA (US); Juan Carlos Santamaria, Alpharetta, GA (US); Shantnu Kakkar, Alpharetta, GA (US); Eric Paul Boehlke, Eagan, MN (US)

(73) Assignee: Trimble Inc., Sunnyvale, CA (US)

( * ) Notice: Subject to any disclaimer, the term of this patent is extended or adjusted under 35 U.S.C. 154(b) by 138 days.

(21) Appl. No.: 17/328,260

(22) Filed: May 24, 2021

(65) Prior Publication Data

US 2022/0374020 A1  Nov. 24, 2022

(51) Int. Cl.
 *G05D 1/02* (2020.01)
 *G01C 21/00* (2006.01)
 *A01C 21/00* (2006.01)

(52) U.S. Cl.
 CPC ....... *G05D 1/0219* (2013.01); *G01C 21/3807* (2020.08); *G05D 1/0225* (2013.01); *A01C 21/00* (2013.01); *G05D 2201/0201* (2013.01)

(58) Field of Classification Search
 CPC ............... G05D 1/0219; G05D 1/0225; G05D 2201/0201; G05D 1/0217; G01C 21/3807;
 (Continued)

(56) References Cited

U.S. PATENT DOCUMENTS 11,185,006 B2 *  11/2021  Green ................. G05D 1/0219
11,500,390 B2     11/2022  Kakkar et al.
(Continued)

FOREIGN PATENT DOCUMENTS

EP  2 957 159 A1  12/2015
EP  2 984 916 A1   2/2016
(Continued)

OTHER PUBLICATIONS

Jensen, M. F., et al., "Coverage planning for capacitated field operations, part II: Optimisation," Biosystems Engineering, Elsevier, Amsterdam, NL, vol. 139, Aug. 6, 2015, pp. 149-164.
(Continued)

*Primary Examiner* — Shelley Chen
(74) *Attorney, Agent, or Firm* — Kilpatrick Townsend & Stockton LLP

(57) ABSTRACT

A method of area coverage planning with replenishment planning includes receiving information of a boundary of the work area, location information of one or more refill stations, and information of a current amount of the material left in the autonomous vehicle, laying a plurality of tracks within the boundary of the work area so as to minimize a total distance of the plurality of tracks, generating a coverage trajectory, and based on (i) the coverage trajectory, (ii) the location information of the one or more refill stations, (iii) the current amount of the material left in the autonomous vehicle, and (iv) a nominal full amount and a nominal consumption rate of the material by the autonomous vehicle, determining one or more logistic points along the coverage trajectory at which a remaining amount of the material reaches a threshold, for each logistic point, generating a replenishment trajectory.

18 Claims, 24 Drawing Sheets

(58) Field of Classification Search
CPC ............ G01C 21/3423; G01C 21/3461; A01C 21/00; G06Q 10/06315; G06Q 50/02; A01B 69/008
See application file for complete search history.

(56) References Cited

U.S. PATENT DOCUMENTS

| | | | | |
|---|---|---|---|---|
| 2004/0193348 | A1* | 9/2004 | Gray | G05D 1/0219 701/50 |
| 2009/0240430 | A1 | 9/2009 | Sachs et al. | |
| 2014/0081568 | A1 | 3/2014 | Pieper et al. | |
| 2017/0144702 | A1 | 5/2017 | Dang et al. | |
| 2018/0359905 | A1 | 12/2018 | Foster et al. | |
| 2018/0364739 | A1 | 12/2018 | Foster et al. | |
| 2019/0146513 | A1 | 5/2019 | Tomita et al. | |
| 2019/0208695 | A1* | 7/2019 | Graf Plessen | A01B 69/007 |
| 2019/0216003 | A1* | 7/2019 | Green | A01B 69/008 |
| 2019/0239416 | A1* | 8/2019 | Green | A01B 69/007 |
| 2019/0353483 | A1 | 11/2019 | Liu | |
| 2020/0296878 | A1 | 9/2020 | Dix | |
| 2021/0341933 | A1 | 11/2021 | Kakkar et al. | |
| 2022/0091613 | A1* | 3/2022 | Alban | A01D 34/008 |
| 2022/0171411 | A1* | 6/2022 | Chiocco | A01D 41/127 |
| 2022/0374019 | A1 | 11/2022 | Tahiliani et al. | |

FOREIGN PATENT DOCUMENTS

| | | | | |
|---|---|---|---|---|
| EP | 2984916 | B1 * | 2/2016 | .......... A01B 69/007 |
| EP | 3 146 825 | A1 | 3/2017 | |
| EP | 3 316 065 | A1 | 5/2018 | |
| EP | 3518649 | B1 * | 12/2020 | .......... A01B 69/008 |
| JP | 2019-068784 | A | 5/2019 | |
| WO | 2017/026080 | A1 | 2/2017 | |
| WO | 2018/055922 | A1 | 3/2018 | |

OTHER PUBLICATIONS

Spekken, M., et al., "Optimized routing on agricultural fields by minimizing maneuvering and servicing time," Precision Agriculture, vol. 14, No. 2, Oct. 21, 2012, pp. 224-244.
Extended European Search Report for Application No. 22174233. 1-1205, dated Oct. 10, 2022, 14 pages.
U.S. Appl. No. 16/863,049 Non-Final Office Action dated Dec. 14, 2022, 31 pages.
U.S. Appl. No. 16/863,049 Non-Final Office Action dated Feb. 9, 2022, 21 pages.
U.S. Appl. No. 16/863,056 Non-Final Office Action dated Feb. 25, 2022, 10 pages.
U.S. Appl. No. 16/863,056 Notice of Allowance dated Jun. 27, 2022, 11 pages.
Han, X. et al., "Simulation Study to Develop Implement Control and Headland Turning Algorithms for Autonomous Tillage Operations," Journal of Biosystems Engineering, (2019) 44: pp. 245-257, Nov. 13, 2019.
Backman, J. et al., "Smooth turning path generation for agricultural vehicles in headlands," Biosystems Engineering 139, (2015), pp. 76-86, Aug. 30, 2015.
U.S. Appl. No. 16/863,049 Final Office Action dated Aug. 29, 2022, 23 pages.
U.S. Appl. No. 16/863,049 Notice of Allowance dated Aug. 15, 2023, 16 pages.
Extended European Search Report for Application No. 22174232. 3-1105, dated Nov. 4, 2022, 18 pages.
U.S. Appl. No. 17/328,251 Non-Final Office Action dated Mar. 20, 2023, 35 pages.
U.S. Appl. No. 16/863,019 Final Office Action dated Mar. 31, 2023, 31 pages.
U.S. Appl. No. 17/328,251 Notice of Allowance dated Oct. 17, 2023, 9 pages.

* cited by examiner

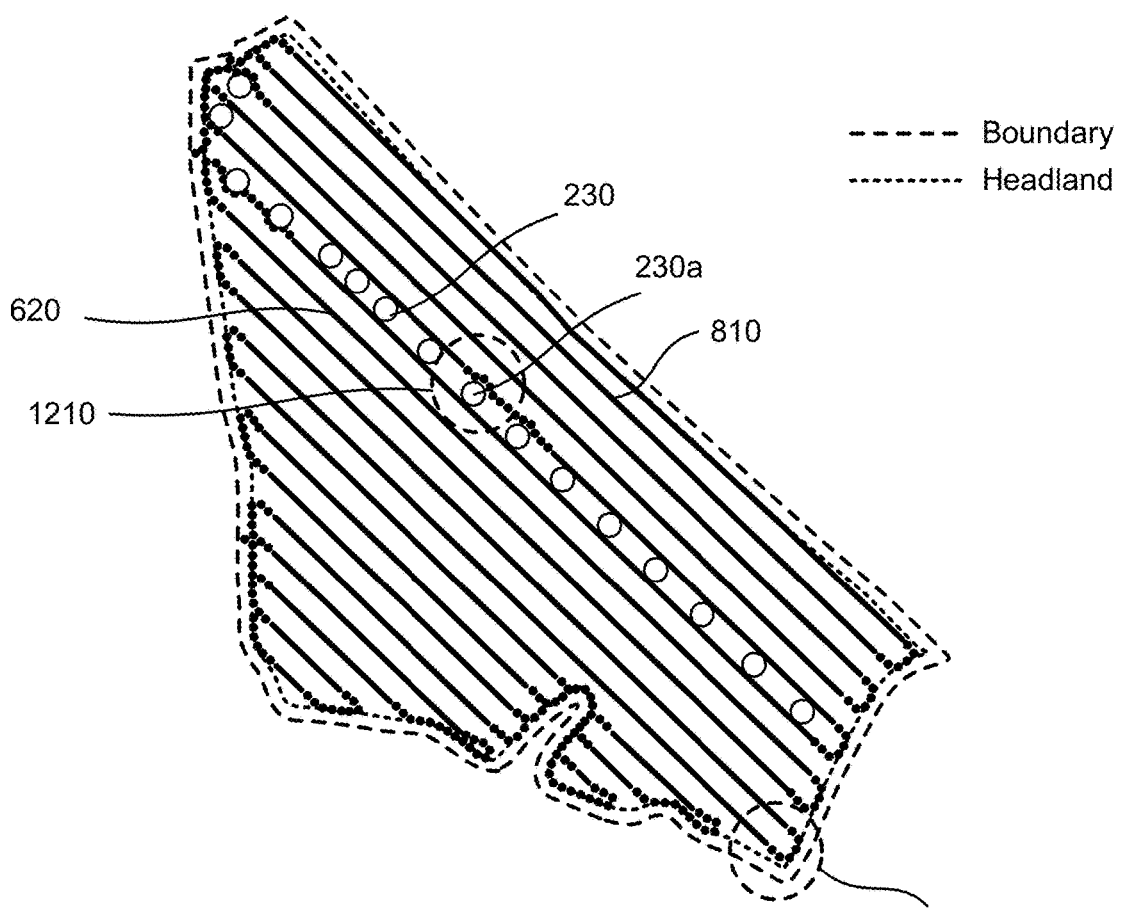
FIG. 12A
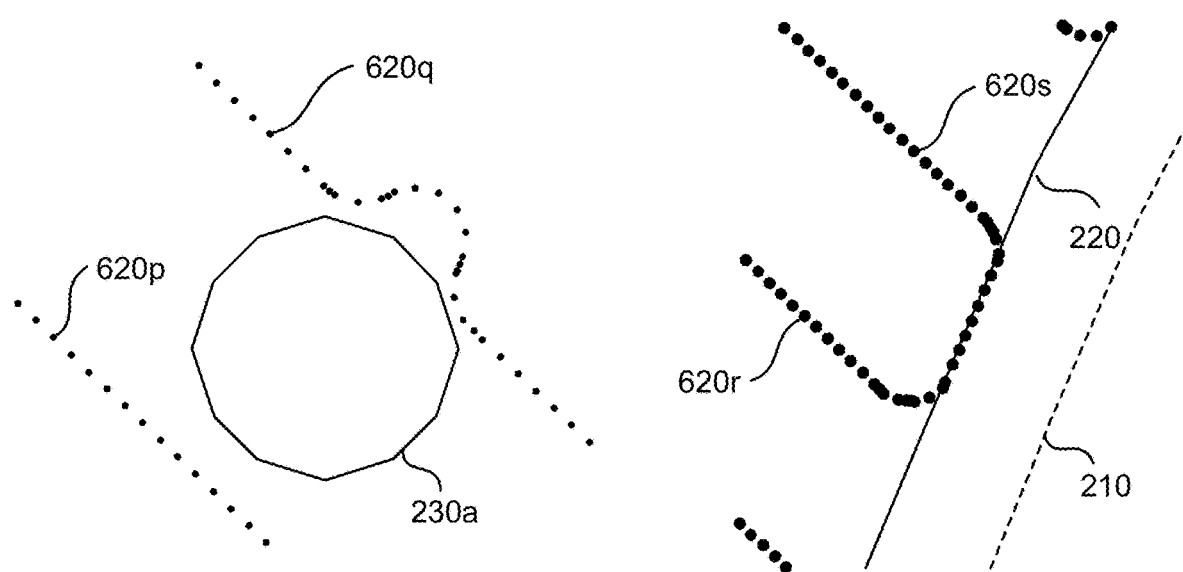
FIG. 12B
FIG. 12C

AREA COVERAGE PLANNER WITH REPLENISHMENT PLANNER

CROSS-REFERENCES TO RELATED APPLICATIONS

The following two U.S. patent applications (including this one) are being filed concurrently, and the entire disclosure of the other application is incorporated by reference into this application for all purposes:
application Ser. No. 17/328,251, filed May 24, 2021, entitled "AREA COVERAGE PLANNER", and
application Ser. No. 17/328,260, filed May 24, 2021, entitled "AREA COVERAGE PLANNER WITH REPLENISHMENT PLANNER").

BACKGROUND

Engineering vehicles such as tractors and compactors are widely used in agriculture and construction. For example, a variety of farm implements may be towed behind or mounted on a tractor to perform various agricultural tasks, such as plowing, irrigation, fertilizer and pesticide spraying, seed spraying, harvesting, and the like. As another example, compactors may be used to create a level grade in construction projects. Autonomous or semi-autonomous vehicles are used for precision agriculture and construction. Various navigation planning algorithms can be used to guide an autonomous vehicle. There is a need for a coverage planner that can generate a coverage trajectory for an autonomous vehicle with an implement to traverse a work area in an efficient way. For some applications, such as fertilizer spraying and seed spraying, the autonomous vehicle may need to be replenished with consumable materials (e.g., fertilizer and seeds) while traversing the work area. For such applications, there is a need for a replenishment planner that can generate replenishment trajectories for the autonomous vehicle.

SUMMARY

According to some embodiments, a method of area coverage planning for an autonomous vehicle includes, at a computer system, receiving information of a boundary of a work area and information of one or more obstacles located within the work area, and laying a plurality of tracks within the boundary of the work area. The plurality of tracks is spaced apart from each other by a spacing. Laying the plurality of tracks includes, based on (i) the information of the boundary of the work area, and (ii) the information of the one or more obstacles, performing a multivariate optimization to: (i) determine an optimal direction of the plurality of tracks, and (ii) an optimal offset for a first track from the boundary, so as to minimize a total distance of the plurality of tracks. The method further includes generating a trajectory that is traversable by the autonomous vehicle to traverse the plurality of tracks.

According to some embodiments, a method of area coverage planning for an autonomous vehicle includes, at a computer system, receiving information of a boundary of a work area, and laying a plurality of tracks within the boundary of the work area. The plurality of tracks is spaced apart from each other by a spacing. Laying the plurality of tracks includes, based on the information of the boundary of the work area, performing a multivariate optimization to: (i) determine an optimal direction of the plurality of tracks, and (ii) an optimal offset for a first track from the boundary, so as to minimize a total distance of the plurality of tracks. The method further includes generating a trajectory that is traversable by the autonomous vehicle to traverse the plurality of tracks.

According to some embodiments, a method of area coverage planning with replenishment planning for an autonomous vehicle includes, at a computer system, receiving information of a boundary of the work area, receiving location information of one or more refill stations for replenishing the material, and receiving information of a current amount of the material left in the autonomous vehicle. The method further includes, based on the information of the boundary of the work area, laying a plurality of tracks within the boundary of the work area so as to minimize a total distance of the plurality of tracks. The plurality of tracks is spaced apart from each other by a spacing. The method further includes generating a coverage trajectory that is traversable by the autonomous vehicle to traverse the plurality of tracks, and based on (i) the coverage trajectory, (ii) the location information of the one or more refill stations, (iii) the current amount of the material left in the autonomous vehicle, and (iv) a nominal full amount and a nominal consumption rate of the material by the autonomous vehicle, determining one or more logistic points along the coverage trajectory at which a remaining amount of the material reaches a threshold. The method further includes, for each respective logistic point of the one or more logistic points, generating a respective replenishment trajectory for the autonomous vehicle. The respective replenishment trajectory includes a first part from the respective logistic point to a respective refill station of the one of the one or more refill stations for replenishing the autonomous vehicle with the material, and a second part from the respective refill station to the respective logistic point for the autonomous vehicle to resume traversing the coverage trajectory.

According to some embodiments, a method of area coverage planning with replenishment planning for an autonomous vehicle includes, at a computer system, receiving information of a boundary of the work area, receiving location information of one or more refill stations for replenishing the material, and receiving information of a current amount of the material left in the autonomous vehicle. The method further includes, based on the information of the boundary of the work area, laying a plurality of tracks within the boundary of the work area so as to minimize a total distance of the plurality of tracks. The plurality of tracks is spaced apart from each other by a spacing. The method further includes generating a coverage trajectory that is traversable by the autonomous vehicle to traverse the plurality of tracks, and based on (i) the coverage trajectory, (ii) the location information of the one or more refill stations, (iii) the current amount of the material left in the autonomous vehicle, and (iv) a nominal full amount and a nominal consumption rate of the material by the autonomous vehicle, determining one or more logistic points along the coverage trajectory at which the autonomous vehicle needs to be replenished with the material. Each respective logistic point is at an end of a respective track. The method further includes, for each respective logistic point of the one or more logistic points, generating a respective replenishment trajectory for the autonomous vehicle. The respective replenishment trajectory includes a first part from the respective logistic point to a respective refill station of the one of the one or more refill stations for replenishing the autonomous vehicle with the material, and a second part from the respective refill station to a beginning of a next track for the autonomous vehicle to resume traversing the coverage trajectory.

BRIEF DESCRIPTION OF THE DRAWINGS

FIGS. 12A-12C illustrate an exemplary velocity profile for a trajectory according to some embodiments.

DETAILED DESCRIPTION

The goal of area coverage can be to efficiently apply an implement across a work area. According to some embodiments, provided with geographical information of the boundary of a work area, an area coverage planner can automatically generate a single trajectory for guiding an autonomous vehicle across the work area, so as to maximize coverage while minimizing the total distance travelled and the total duration of time, thus saving fuel and resources. The boundary can have irregular shapes, and can have convex as well as concave sections. In some embodiments, the area coverage planner can accommodate static obstacles, such as electrical poles, located inside the boundary so that the trajectory avoids the static obstacles. The area coverage planner can optimize the layout of tracks based on the geometry of the boundary and the locations and the geometries of the static obstacles.

In some embodiments, the area coverage planner can generate a trajectory for traversing the tracks (which can be either generated by the optimization or pre-determined). In some embodiments, given the location of an entry point and the location of an exit point, the area coverage planner can generate an entry route from the entry point to a first track, and an exit route from a last track to the exit point. In some embodiments, the area coverage planner can also generate a headland pass along a headland guideline at a periphery of the boundary. The headland pass can be traversed by the autonomous vehicle before, after, or in between traversing the tracks (e.g., as specified by a user). The entry route, the exit route, and the headland pass, as well as the trajectory for traversing the tracks, are traversable by the autonomous vehicle based on the constraints of the vehicle.

The following terms can be used herein to describe a work area. The term "geofence" may refer to a geographical boundary of a work area (e.g., an agricultural field, a construction site, and the like) that no part of the vehicle is permitted to go beyond. The term "boundary" may refer to any polygon or closed curve that is either identical to the geofence or is inwardly offset from the geofence. For example, a farmer may drive the vehicle around the crop rows to record a boundary of the work area. In construction applications, information of the boundary may be available by construction surveys and the site design. Information of the boundary may also be obtained by manually walking up the boundary, by using an autonomous ground vehicle (AGV), or the like. The boundary information may be input to an area coverage planner for algorithmic computation. The boundary may be used as the geofence. The term "headland" may refer to the region between the geofence and a second boundary inwardly offset from the geofence.

Figure 1:
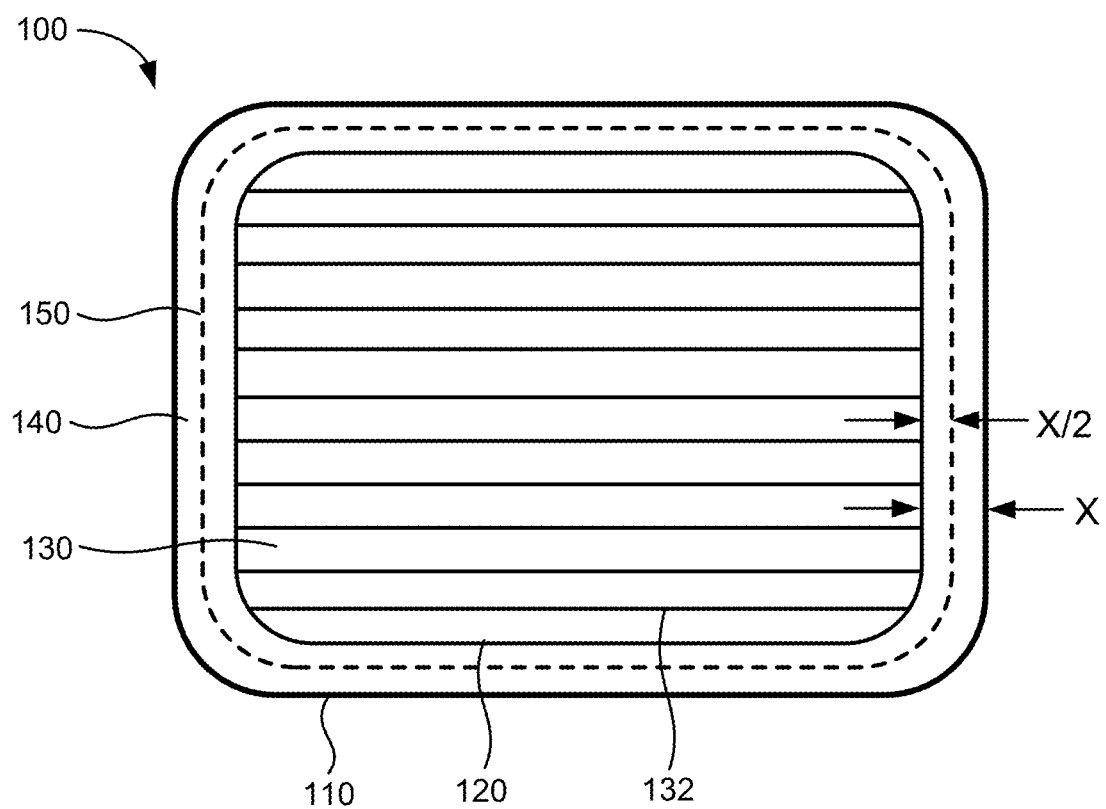
FIG. 1 illustrates an exemplary work area.

FIG. 1 illustrates an exemplary work area 100. The work area 100 has a boundary or geofence 110. A second boundary 120 is inwardly offset from the geofence 110. The region inside the second boundary 120 may be the cropped area 130 with many swaths 132. The region between the geofence 110 and the second boundary 120 may be referred to herein as the headland 140. The geofence 110 may be referred to as the outer boundary of the headland 140. The second boundary 120 may be referred to as the inner boundary of the headland 140 or as the headland boundary. The offset distance between the geofence 110 and the second boundary 120 may be referred to as the width of the headland 140. A headland 140 may have a width that is an integer multiple of the implement width X being used. For instance, in the example illustrated in FIG. 1, the width of the headland is equal to the implement width X.

The term "headland guideline" may refer to a guidance line 150 inside the headland 140 that may be used as a route for a vehicle to traverse along to cover the headland 140 or transition from one track to a next track (or from one segment of a track to a next segment of the track). For instance, in the example illustrated in FIG. 1, the guidance line 150 may be offset from the headland boundary 120 by a distance that is equal to one half of the implement width X.

According to some embodiments, an area coverage planner can accommodate work areas (e.g., fields) with arbitrary boundary shapes. For example, a work area can have a boundary with an irregular shape. The boundary can also include convex sections as well as concave sections. In addition, the work area can include static obstacles within the boundary. In the discussions below, examples as applied to agricultural vehicles (e.g., tractors) working in fields will be used for illustration purposes. But embodiments of the present invention can be applied to applications other than agricultural applications, such as constructions.

Figure 2:
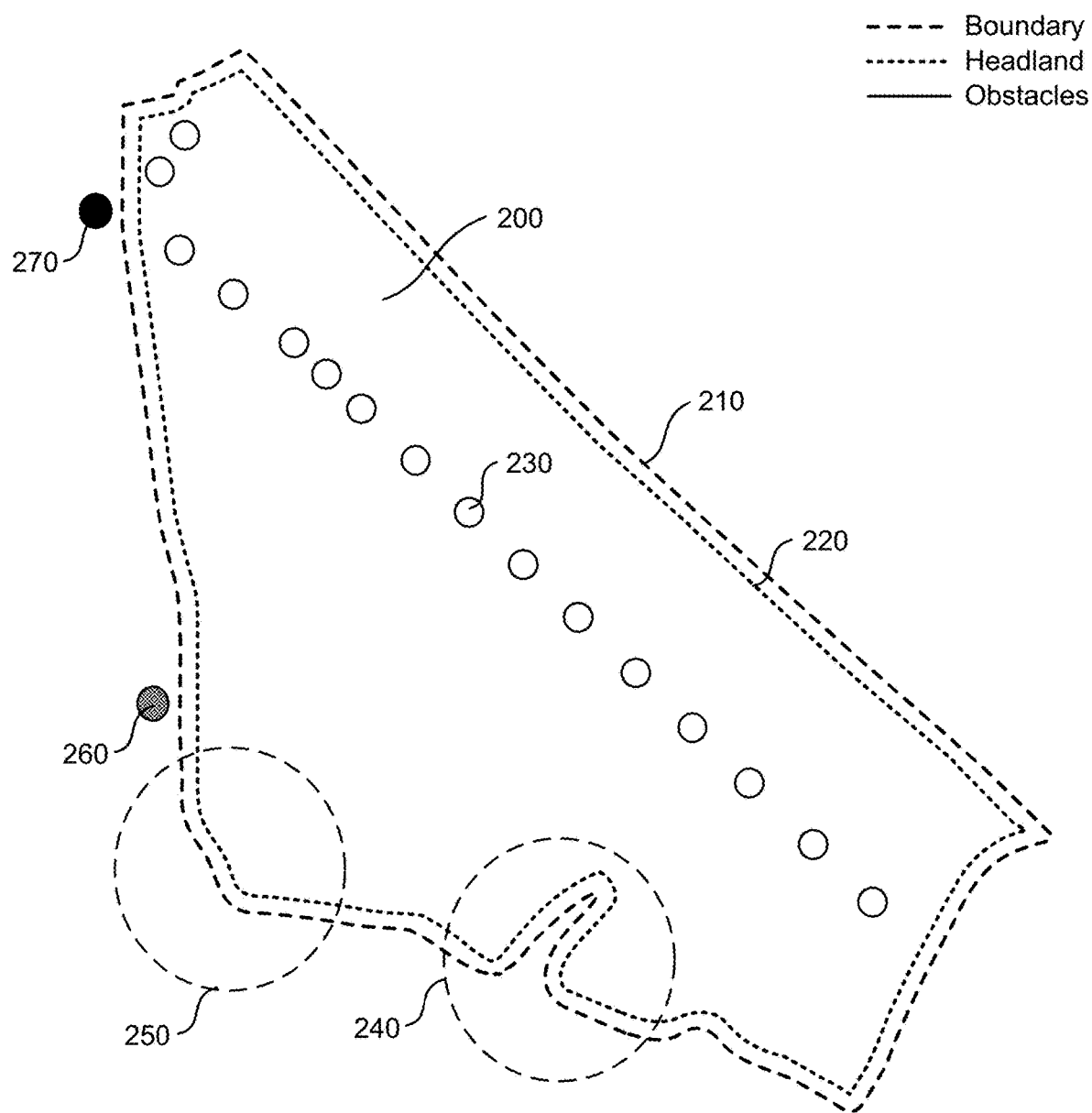
FIG. 2 shows an exemplary field with a boundary and obstacles.

FIG. 2 shows an exemplary field 200 with a boundary 210. The field 200 can have an optional headland guideline 220. As illustrated, the boundary 210 can have an irregular shape, and can have convex sections (e.g., the section 250) as well as concave sections (e.g., section 240). The field 200 can include some static obstacles 230 (e.g., electrical poles) within its boundary 210. Optionally, an entry point 260 and an exit point 270 can be pre-defined.

Information of the boundary 210 (e.g., geometrical and location information) and information of the obstacles 230 (e.g., geometrical and location information) can be input into an area coverage planner. According to some embodiments, given this information, a first task for the area coverage planner may be to lay down the tracks for a vehicle to traverse in order to cover the entire field 200.

Figure 3A:
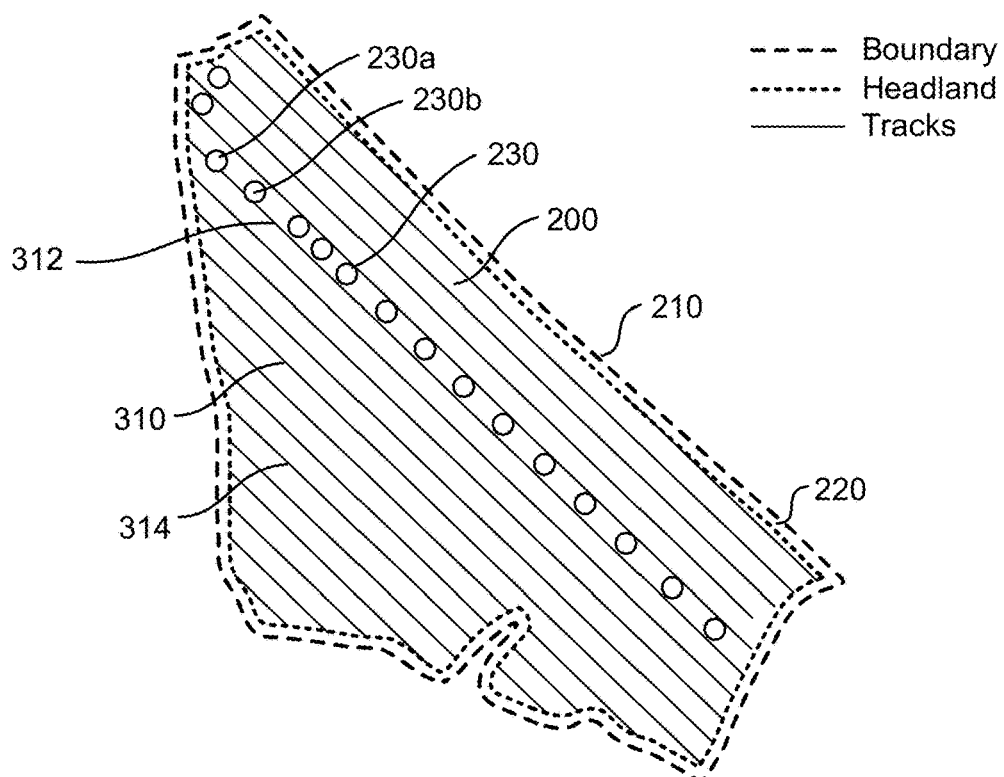
FIGS. 3A and 3B show an exemplary layout of tracks in a field according to some embodiments.

FIG. 3A shows an exemplary layout of tracks (e.g., swaths) in the field 200 according to some embodiments. As illustrated, the tracks 310 can be a series of straight lines that cover the entire field 200. The tracks 310 can be advantageously made parallel to each other. The spacing between adjacent tracks 310 can be related to the width of an implement attached to the vehicle (e.g., equal to, slightly smaller, or slightly greater than the width of the implement, depending on whether an overlap or a gap in the coverage between adjacent tracks is desired). In this manner, as the vehicle traverses along a given track 310, the implement extends about one half of the track spacing on either side. Thus, as the vehicle completes traversing all the tracks 310 in the field, the entire field 200 can be covered. According to some embodiments, the spacing between adjacent tracks 310 can be specified by a user.

Figure 3B:
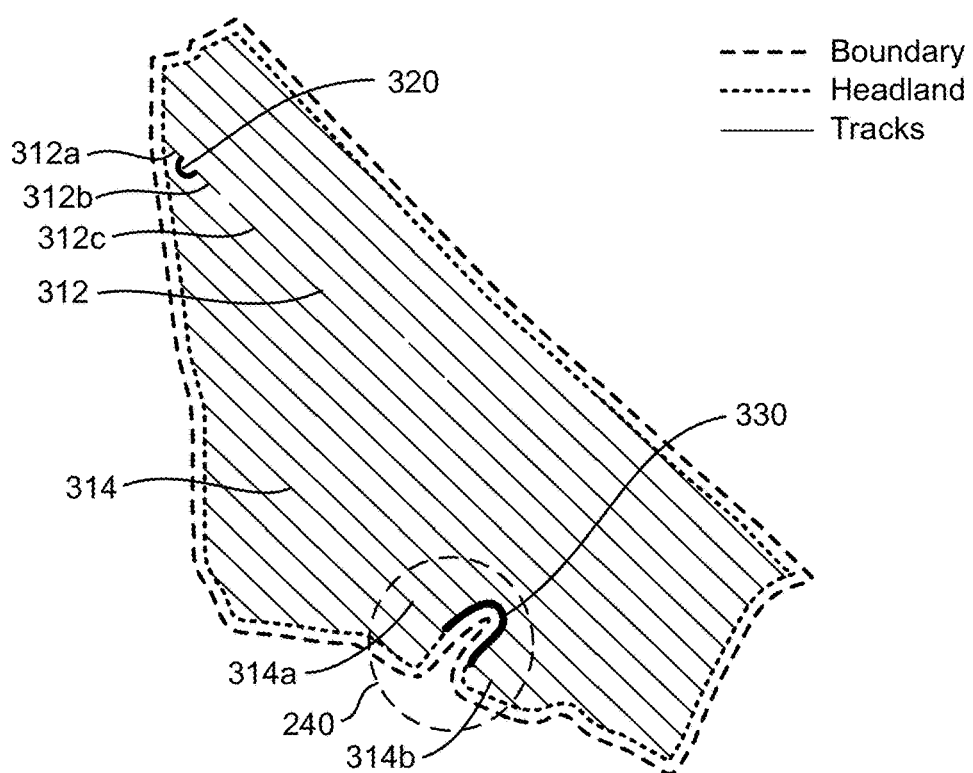

As illustrated in FIG. 3A, some tracks 310 can intersect some of the obstacles 230. For example, the track 312 intersects the obstacles 230a and 230b. Thus, the track 312 can be divided into three segments 312a, 312b, and 312c, as illustrated in FIG. 3B. FIG. 3B shows the tracks 310 without showing the obstacles 230, so as to show the segments more clearly. In addition, some tracks 310 can intersect the boundary 210. For example, the track 314 intersects the concave section 240 of the boundary 210. Thus, the track 314 can be divided into two segments 314a and 314b, as illustrated in FIG. 3B.

To transition from one segment to a next segment of a track, the vehicle may need to make a turn. For example, referring to FIG. 3B, to transition from the segment 312a to the segment 312b, the vehicle may need to make a semicircular turn 320 to get around the obstacle 230a (the obstacle 230a is not shown in FIG. 3B). Similarly, to transition from the segment 314a to the segment 314b, the vehicle may need to navigate along the curved path 330 (e.g., along the headland guideline 220) so as not to cross the concave section 240 of the boundary 210. Also, to transition from the end of one track to the beginning of a next track, the vehicle may need to make an end-of-row-turn (e.g., a U-shaped turn along the headland guideline 220). Since the vehicle may need to slow down in order to make a turn, more number of turns can result in a longer total duration of time to traverse all the tracks. Therefore, it can be advantageous to lay down the tracks 310 in a way that minimizes the total number of segments to the extent possible. A track that does not intercept any obstacle 230 can be considered as one segment. The number of segments can depend on the offset and the direction of the tracks, as discussed below.

Figure 4A:
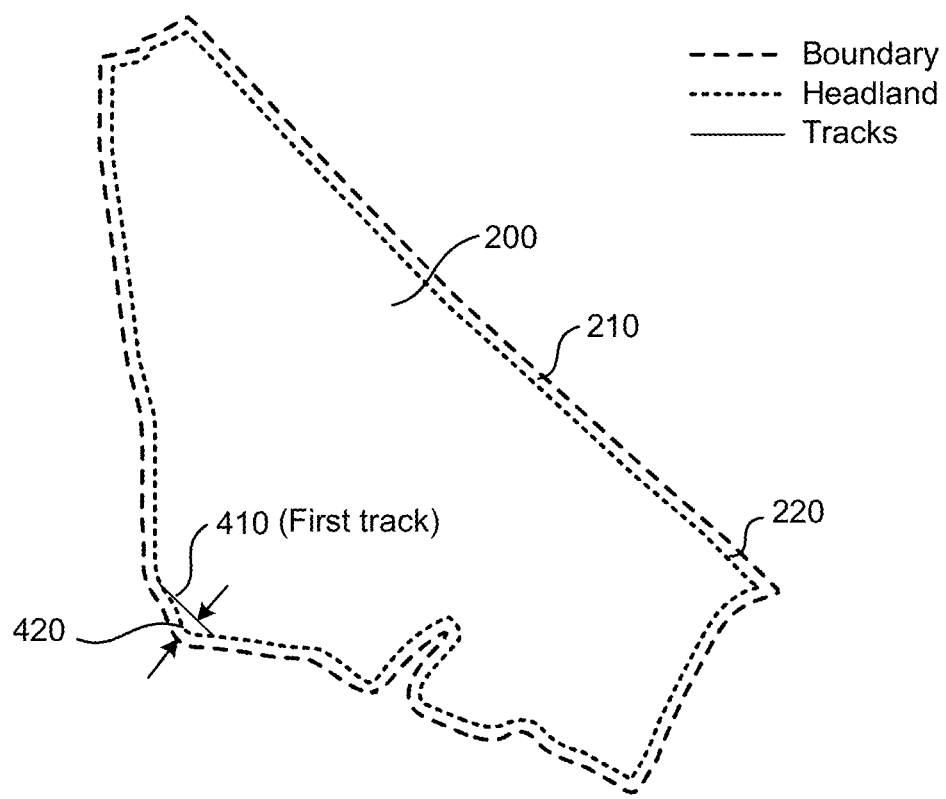
FIGS. 4A and 4B illustrate two examples of offset for laying down tracks in a field according to some embodiments.
Figure 4B:
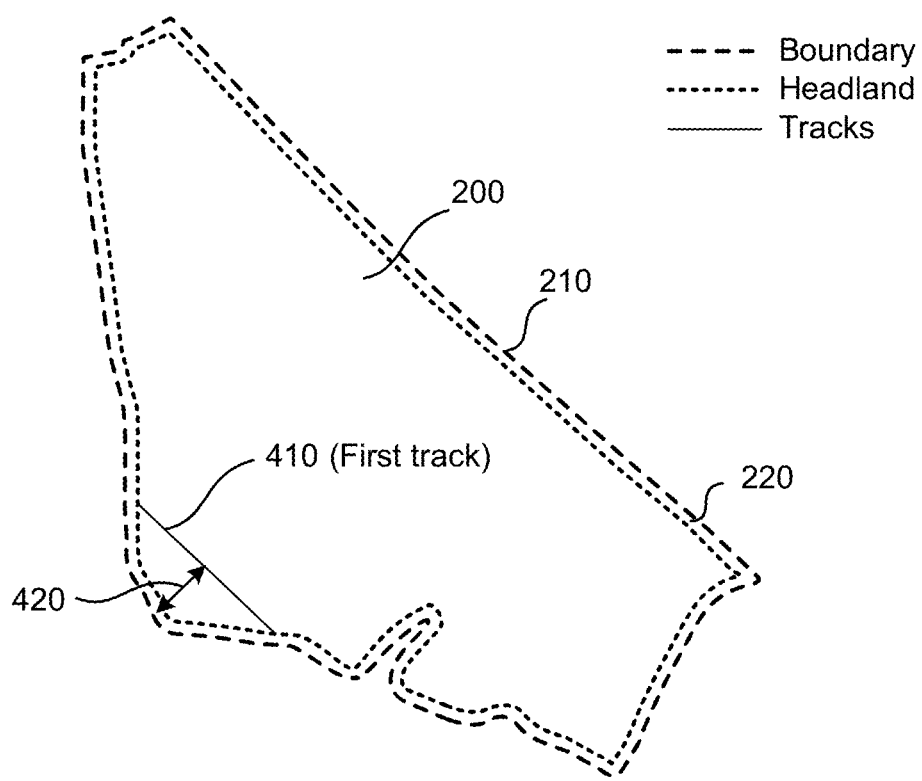

FIGS. 4A and 4B illustrate two examples of offset for laying down tracks in the field 200. The term "offset" refers to the distance 420 of a first track 410 from the boundary 210. The value of the offset can be a parameter to be optimized by the area coverage planner. In the example shown in FIG. 4A, the value of the offset 420 is 23 meters. In the example shown in FIG. 4B, the value of the offset 420 is 100 meters.

Figure 5A:
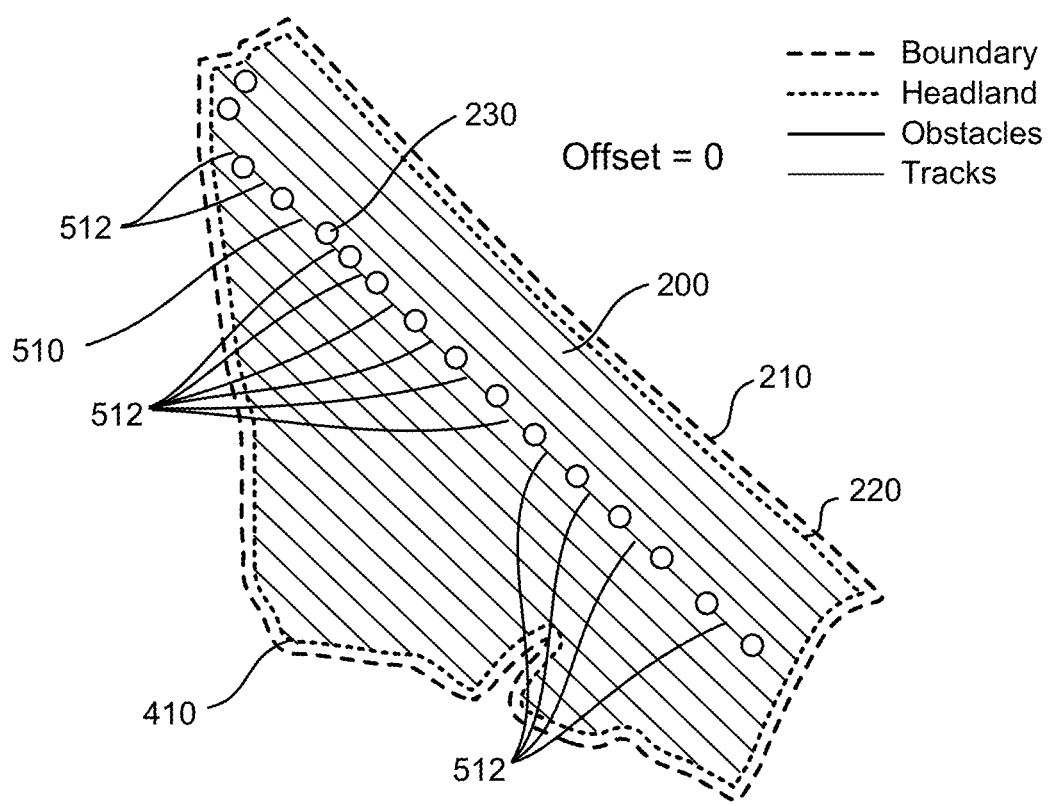
FIGS. 5A and 5B illustrate how the value of the offset can affect the number of segments in a track layout according to some embodiments.
Figure 5B:
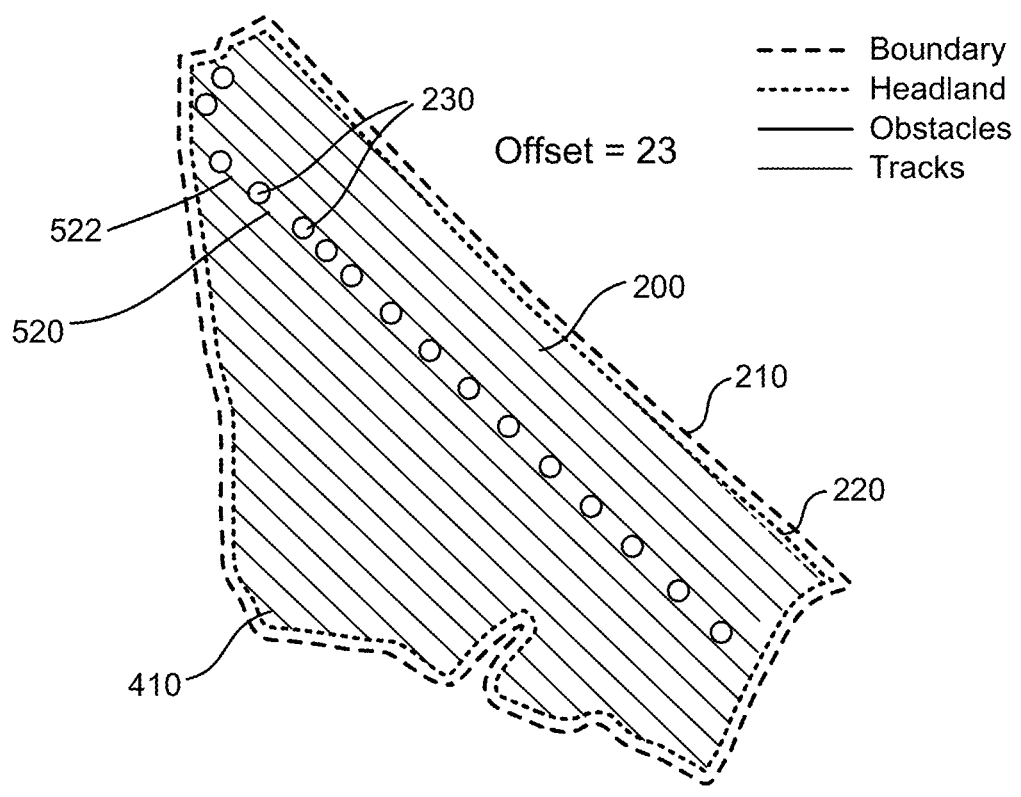

FIGS. 5A and 5B illustrate how the value of the offset 420 can affect the total number of segments in a track layout. In the example illustrated in FIG. 5A, the value of the offset is set to zero (i.e., the first track 410 starts at the boundary 210). Once the first track 410 is laid, the other tracks can be laid spaced apart from the first track 410 with an equal spacing with respect to each other (e.g., equal to the width of an implement attached to the vehicle). As illustrated in FIG. 5A, for this value of the offset, the track 510 intercepts the row of obstacles 230, and is divided into as many as fifteen segments 512. In the example illustrated in FIG. 5B, the value of the offset is set to 23 meters. As illustrated, here the tracks lie on either side of the row of obstacles 230. As a result, the track 520 intercepts only two obstacles 230, and is divided into as few as three segments 522.

As discussed above, more segments can require more turns, and more turns can result in a longer duration of time. Thus, the track layout shown in FIG. 5B can be more advantageous than the track layout shown in FIG. 5A as it includes less number of segments. For example, for the track layout shown in FIG. 5A, the vehicle would make a total of 202 turns (including turns for transitioning from one track to a next track, referred to as end-of-row-turns), travel a total distance of about 18042 meters, over a total duration of time of about 6227 seconds, in order to complete all the tracks to cover the entire field 200. In comparison, for the track layout shown in FIG. 5B, the vehicle would make only a total of 154 turns (which is 48 turns less than 202 turns), travel a total distance of only 17330 meters (which is 712 meters less than 18042 meters), over a total duration of time of about 5907 seconds (which is 320 seconds less than 6227 seconds).

Figure 6A:
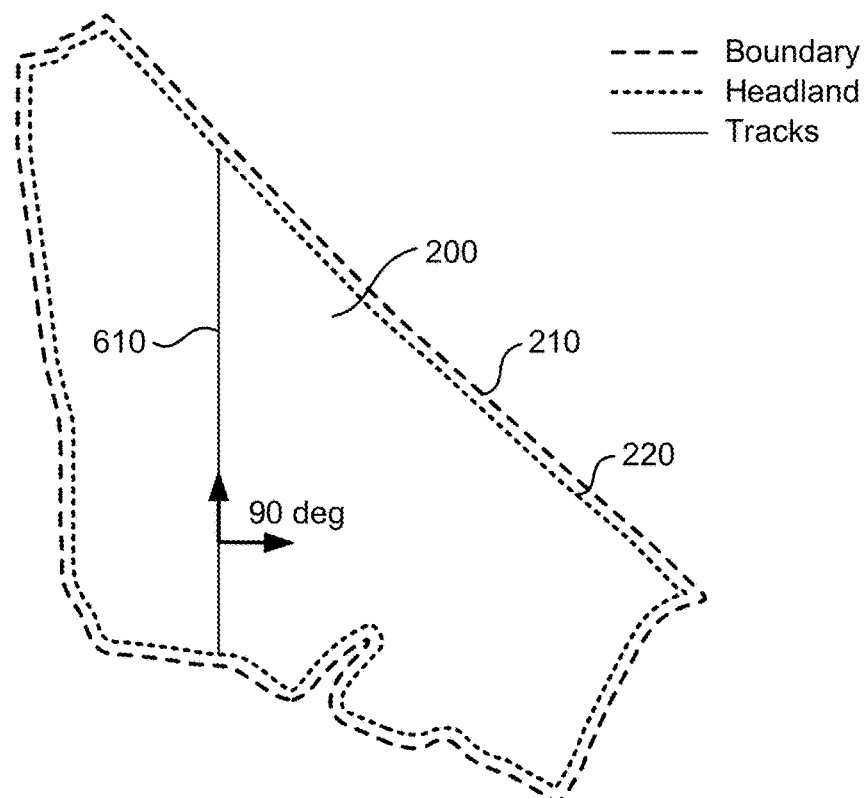
FIGS. 6A and 6B illustrate two examples of the direction of tracks in a field according to some embodiments.
Figure 6B:
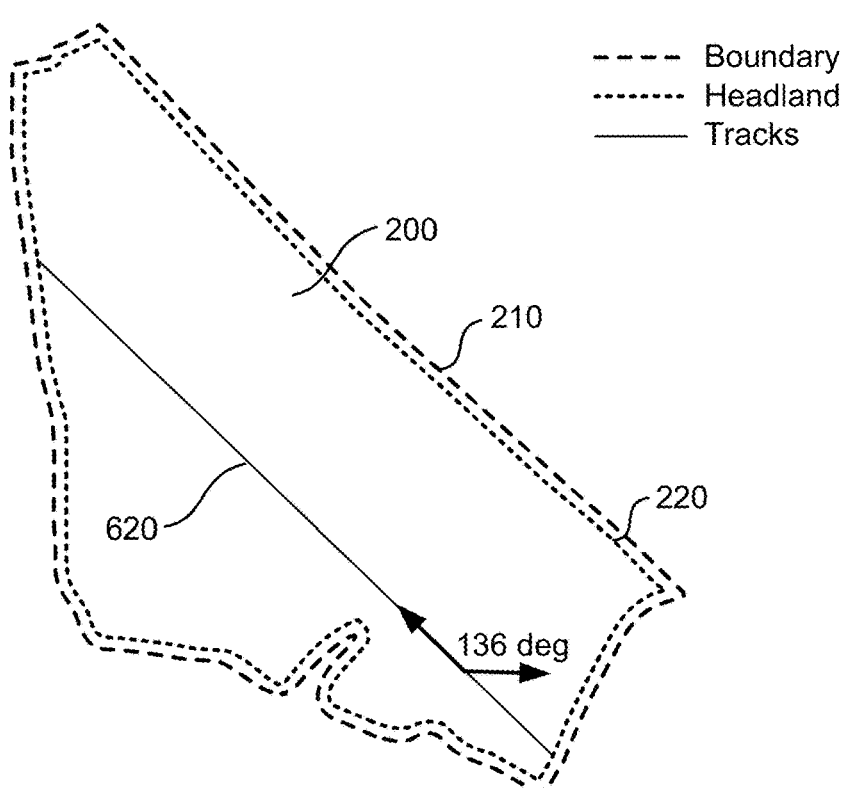

FIGS. 6A and 6B illustrate two examples of the direction of tracks in the field 200. In the example shown in FIG. 6A, the tracks 610 are perpendicular to the horizontal axis (e.g., aligned with the North-South direction). In the example shown in FIG. 6B, the tracks 620 are tilted at 136 degrees with respect to the horizontal axis.

Figure 7A:
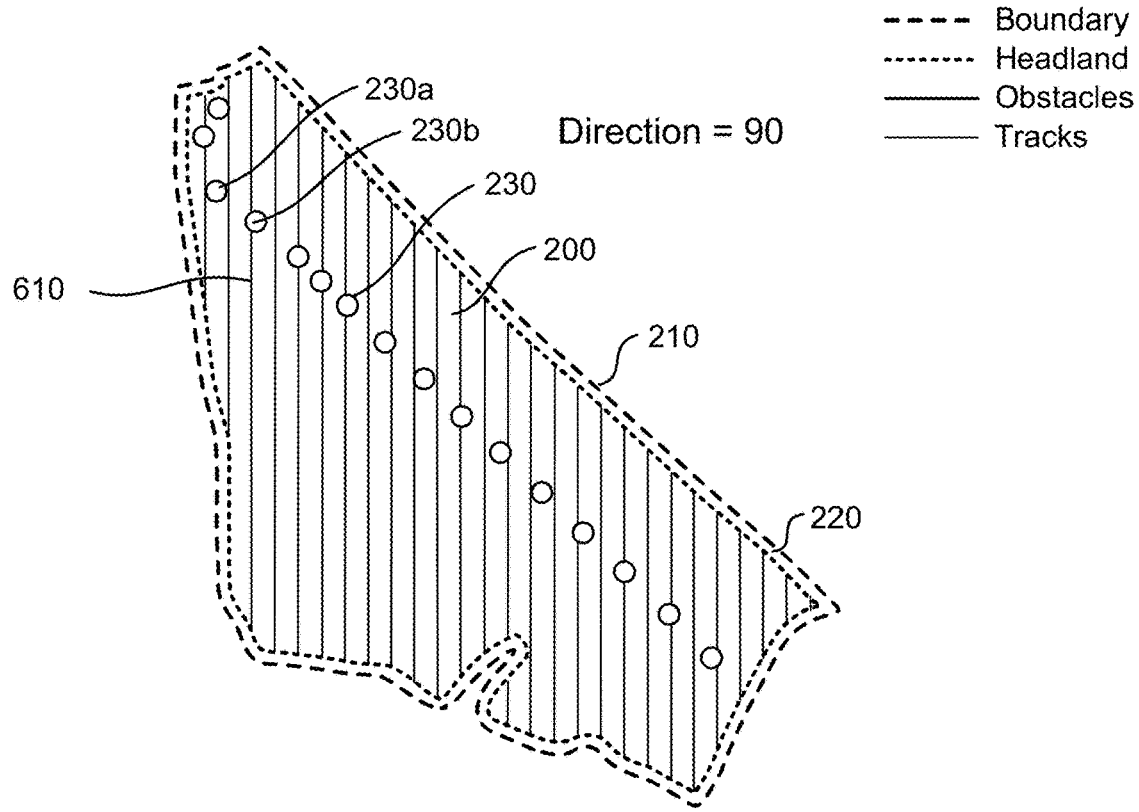
FIGS. 7A and 7B illustrate how the direction of tracks can affect the number of segments in a track layout according to some embodiments.
Figure 7B:
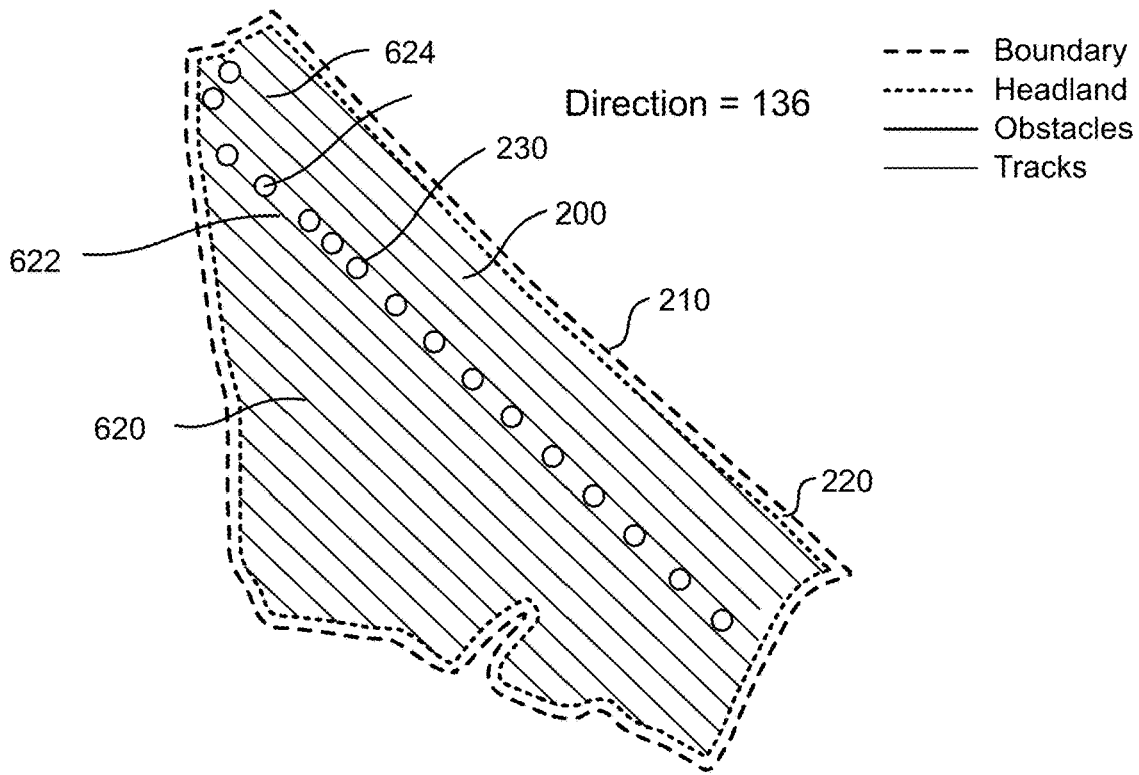

FIGS. 7A and 7B illustrate how the direction of tracks can affect the total number of segments in a track layout. In the example illustrated in FIG. 7A in which the tracks 610 are perpendicular to the horizontal axis, many tracks 610 intercept the obstacles 230, and thus are divided into multiple segments. In comparison, in the example illustrated in FIG. 7B in which the tracks 620 are tilted at 136 degrees so that the tracks 620 lie on either side of the row of the obstacles 230, only a few tracks (e.g., the tracks 622 and 624) intercept the obstacles 230 and are divided into multiple segments. In addition, the track layout shown in FIG. 7A includes a total of 26 tracks, whereas the track layout shown in FIG. 7B includes only a total of 18 tracks. Thus, there are more end-of-row-turns in the track layout shown in FIG. 7A than in the track layout shown in FIG. 7B.

Thus, the track layout shown in FIG. 7B can be more advantageous than the track layout shown in FIG. 7A as it includes less number of segments. For example, the track layout shown in FIG. 7A would require a total of 208 turns, a total distance of about 18511 meters, and a total duration of time of about 6399 seconds. In comparison, the track layout shown in FIG. 7B would require only 154 turns (which is 54 turns less than 202 turns), a total distance of only about 17330 meters (which is 1181 meters less than 18042 meters), and a total duration of time of only about 5907 seconds (which is 492 seconds less than 6227 seconds).

Figure 7C:
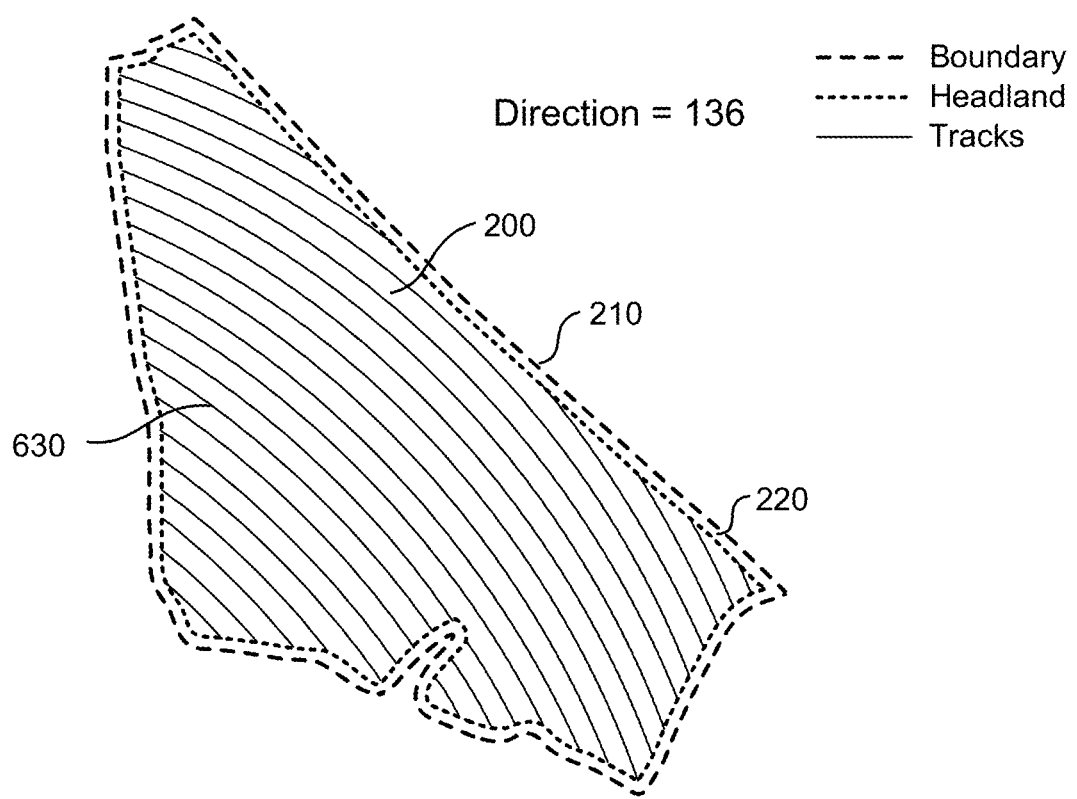
FIG. 7C illustrate an exemplary track layout that includes curved tracks according to some embodiments.

According to some embodiments, a track layout can include curved tracks. FIG. 7C illustrate an example. The tracks 630 have a slight curvature (e.g., arc-shaped), and are spaced apart from each other by a spacing. Tracks with other gradual curved shapes are also possible. One of ordinary skill in the art would recognize many variations, alternatives, and modifications.

As discussed above with reference to FIGS. 4A-4B, 5A-5B, 6A-6B, and 7A-7B, an area coverage planner can optimize both the offset and the direction of the tracks in a track layout. According to some embodiments, the area coverage planner can perform a multivariate optimization to obtain an optimal offset and an optimal direction of the tracks based on a heuristic objective. For example, the heuristic objective can include one of more of the following: minimum total distance traveled, minimum total duration, minimum number of turns, and maximum coverage. These objectives can be interrelated. For example, minimum total distance and minimum number of turns can help achieve minimum total duration. In the multivariate optimization, the offset and the direction of the tracks are optimized simultaneously.

After the tracks have been laid down in a work area, the next task for the area coverage planner is to generate a trajectory for an autonomous vehicle to traverse the tracks to cover the work area.

Figure 8:
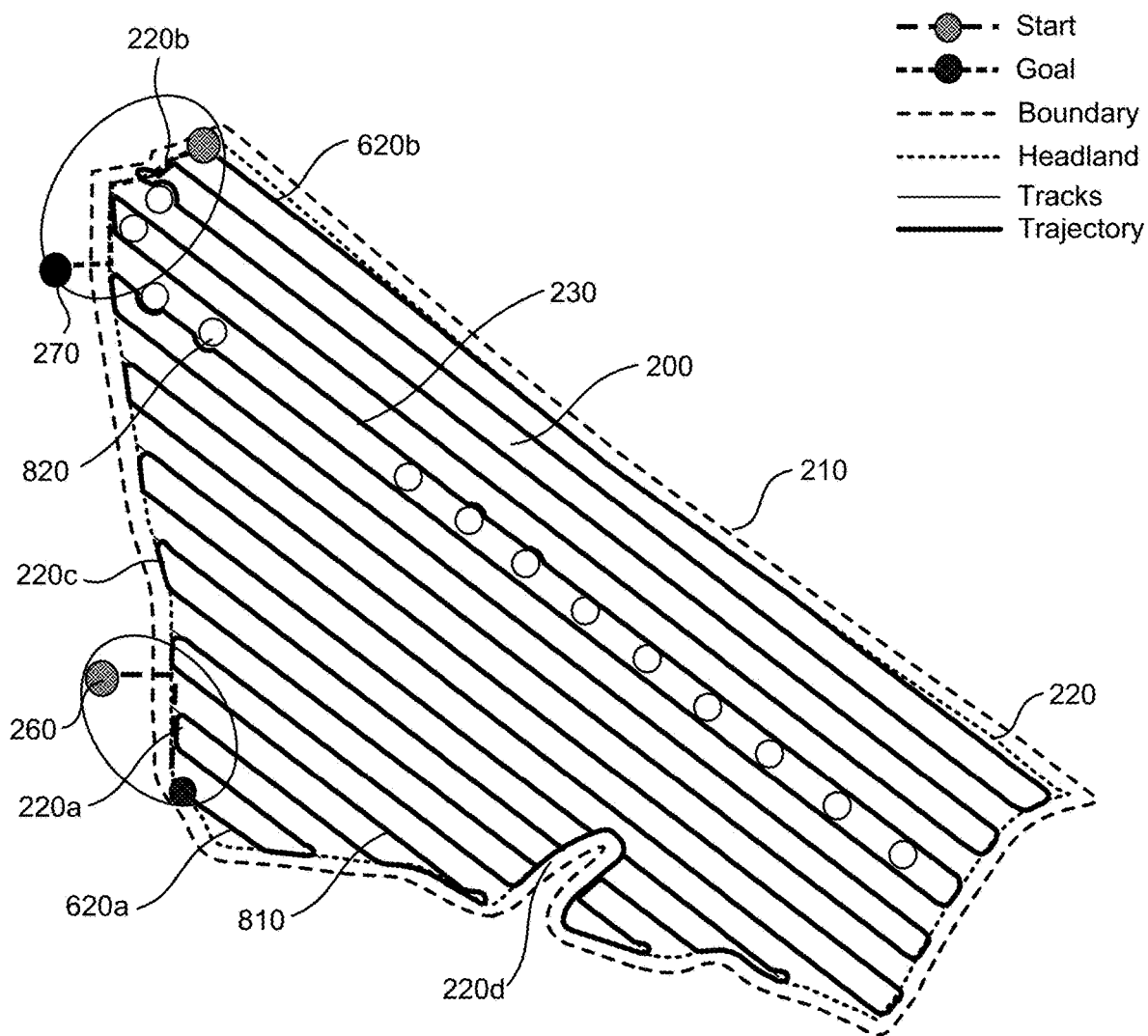
FIG. 8 shows an exemplary trajectory for traversing the tracks according to some embodiments.

FIG. 8 shows an exemplary trajectory 810 for traversing the tracks 620 shown in FIG. 7B (the tracks are overlaid with the trajectory 810). An entry point 260 and an exit point 270 can be optionally pre-defined. The trajectory 810 can start from the entry point 260, and then continue along a section 220a of the headland guideline 210 onto the first track 620a. The trajectory 810 then traverses the tracks sequentially until it completes the last track 620b, and then continues along a section 220b of the headland guideline 210 to reach the exit point 270. When transitioning from one track to a next track, the trajectory 810 can include a turn along a section of the headland guideline 220 (e.g., the section 220c). When transitioning from one segment to a next segment that are separated from each other by a section of the boundary 210, the trajectory 810 can include a turn along a section of the headland guideline 220 (e.g., the section 220d). When transitioning from one segment to a next segment that are separated from each other by an obstacle 230, the trajectory 810 can include a turn around the obstacle 230 (e.g., the turn 820).

Figure 9A:
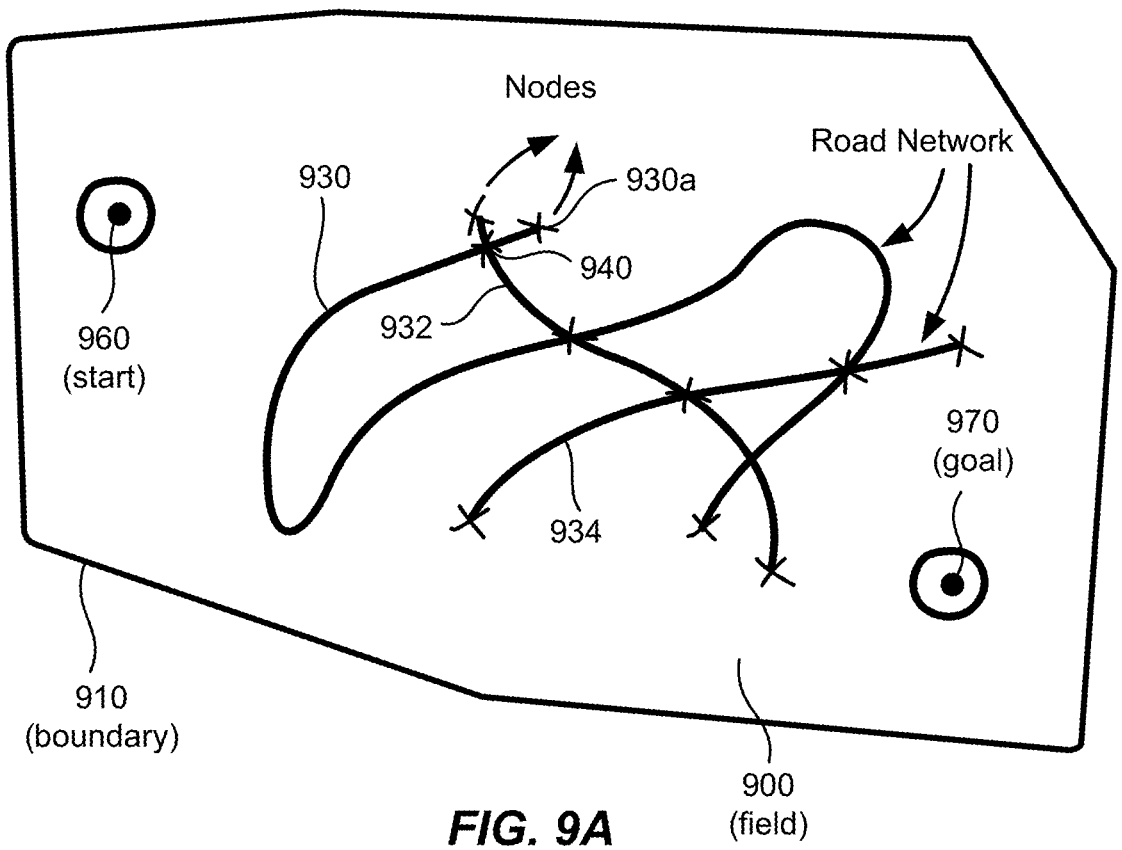
FIGS. 9A and 9B illustrate a concept of route planning according to some embodiments.
Figure 9B:
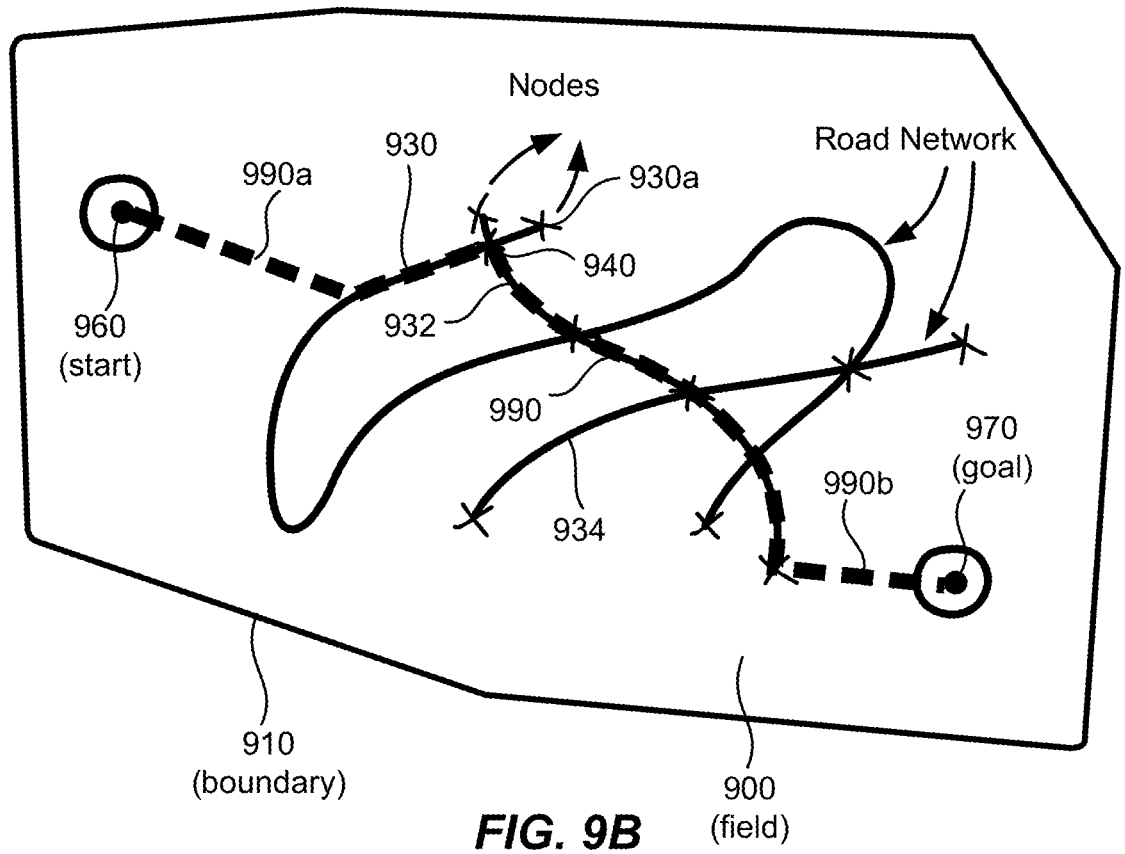

FIGS. 9A and 9B illustrate a concept of route planning according to some embodiments. Assume that a field 900 with a boundary 910 includes a network of roads (e.g., the roads 930, 932, and 934). Each road can have an associated unit cost of traversing that road (e.g., cost per meter). In some embodiments, each road can be specified to be a bi-directional (e.g., two-way road) or unidirectional (e.g., one-way road). The end points of each road (e.g., the end point 930a of the road 930) and the cross-road points where two road cross each other (e.g., the cross road point 940 where the road 932 and the road 930 cross each other) can be referred to as nodes. Assume that traveling off-road (e.g., in areas where no road exits) has an associated unit cost much higher than that of the unit cost of any of the roads 930, 932, and 934. The task of a route planner may be to find an optimal route from a starting point 960 to a goal point 970 that will incur a minimum cost.

FIG. 9B shows a possible optimal route 990 that the route planner can generate. Because the unit cost of travelling off-road has a much higher unit cost than traveling on the roads, the optimal route 990 (e.g., represented by the thick dashed line) can advantageously be on the roads as much as possible. The optimal route 990 can include a relatively short off-road segment 990a between the starting point 960 and a nearest road 930, and a relatively short off-road segment 990b between the goal point 970 and a nearest road 932. Assume that the unit cost for the different roads 930, 932, and 934 are about the same, the optimal route 990 can include an on-road section that has a shortest total distance traveled. For instance, in the example illustrated in FIG. 9B, the on-road section can include a first sub-section on the road 930, and a second sub-section on the road 932. The total distance of the first sub-section and the second sub-section can be the shortest possible distance. To avoid being off-road, transitioning from the road 930 to the road 932 occurs at the node 940 at which the road 930 and the road 932 cross each other.

Figure 10:
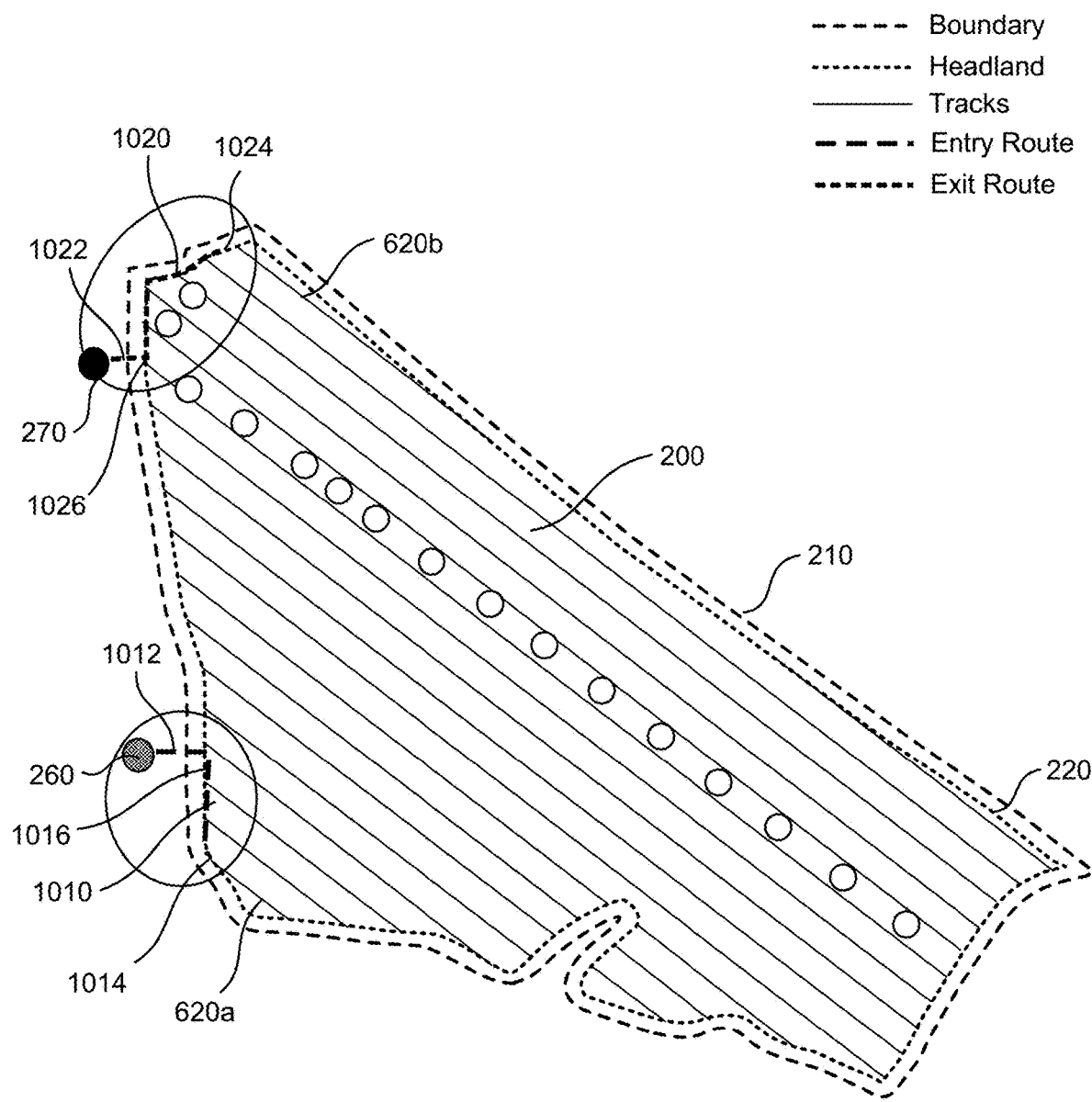
FIG. 10 shows how the route-planning concept illustrated in FIGS. 9A and 9B can be applied to optimizing an entry route and an exit route according to some embodiments.

FIG. 10 shows how the route-planning concept discussed above can be applied to optimizing an entry route and an exit route according to some embodiments. The tracks 620 and the headland guideline 220 form the network of roads. For the entry route, the starting point can be the entry point 260, and the goal point 1014. The goal point 1014 can be the beginning of the first track 620a. An optimal entry route 1010 can include a relatively short off-road segment 1012 between the entry point 260 and a nearest point 1016 on the headland guideline 220, followed by a segment along the headland guideline 220 to the goal point 1014. For the exit route 1020, the starting point 1024 can be the end of the last track 620b, and the goal point can be the exit point 270. An optimal exit route 1020 can include a segment along the headland guideline 220, followed by a relatively short off-road segment between the exit point 270 and a nearest point 1026 on the headland guideline 220.

According to some embodiments, after an optimal route has been generated, the area coverage planner can convert the route into a traversable trajectory to be used for guiding an autonomous vehicle. A traversable trajectory is one that can be executed by the autonomous vehicle given its motion limitations. For example, the autonomous vehicle may not be able to make a sharp turn due to its motion constraints. In a traversable trajectory, sharp corners can be converted into traversable corners.

Figure 11A:
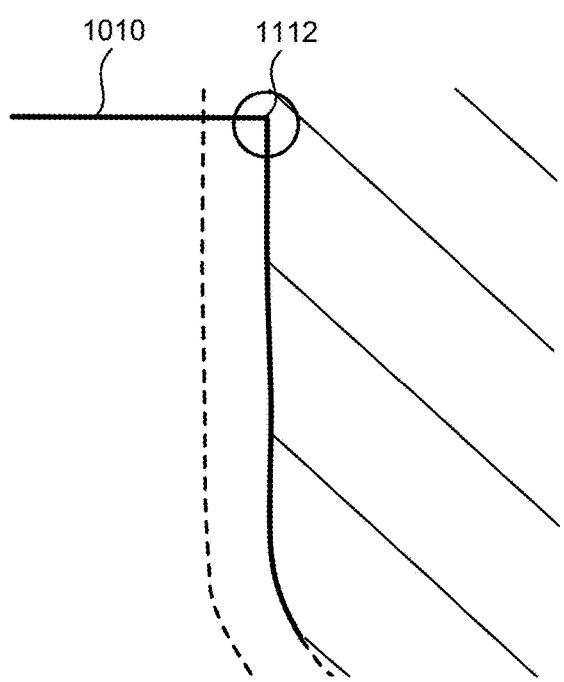
FIGS. 11A-11D illustrate the conversion from routes into traversable trajectories according to some embodiments.
Figure 11B:
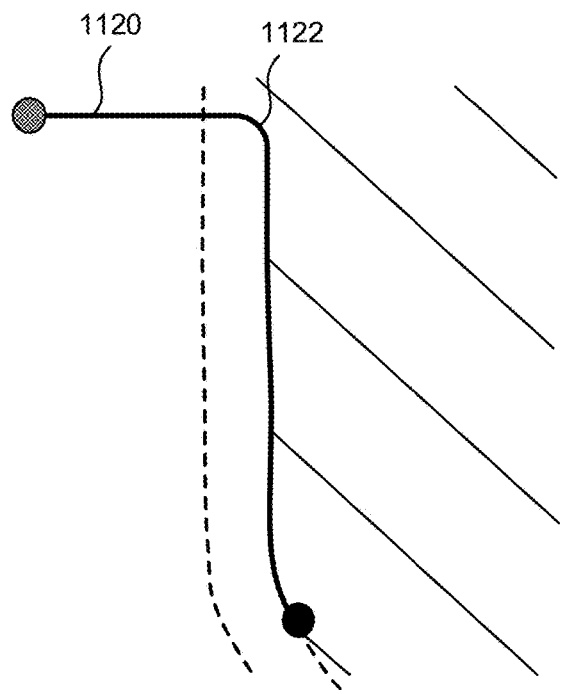

FIGS. 11A-11D illustrate the conversion from routes into traversable trajectories according to some embodiments. FIG. 11A shows the entry route 1010 (solid line) as shown in FIG. 10. As illustrated, the entry route 1010 includes a sharp corner 1112. FIG. 11B shows a traversable trajectory 1120 (dashed line) converted from the entry route 1010. As illustrated, the sharp corner 1112 in the entry route is converted into a rounded corner 1122 in the traversable trajectory 1120, so that the autonomous vehicle may be able to execute the turn.

Figure 11C:
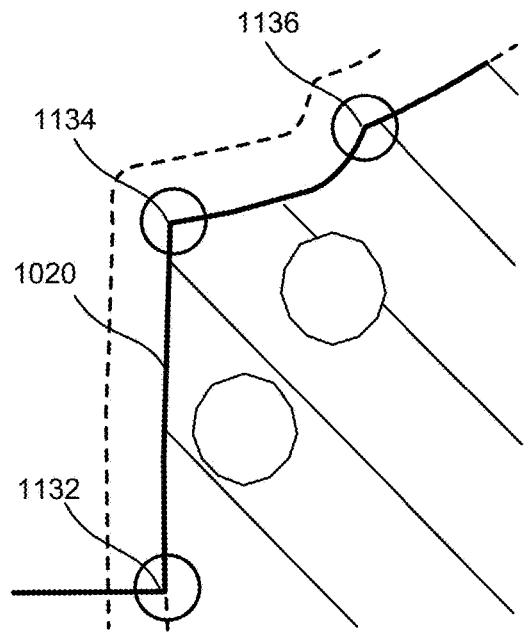
Figure 11D:
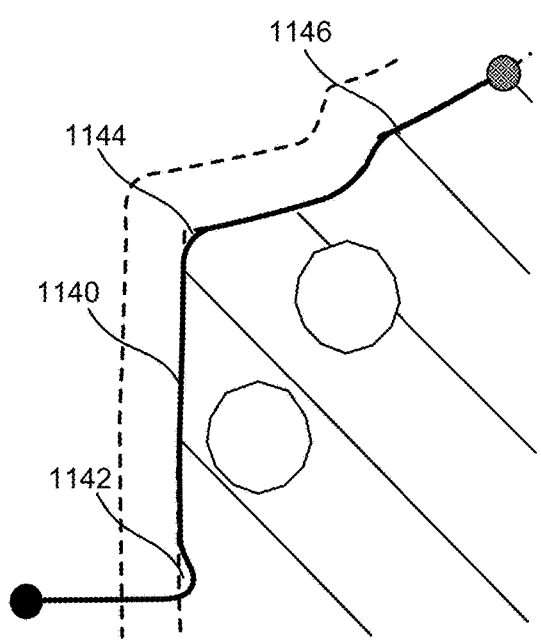

FIG. 11C shows the exit route 1020 (solid line) as shown in FIG. 10. As illustrated, the exit route 1020 includes three sharp turns 1132, 1134, and 1136. FIG. 11D shows a traversable trajectory 1140 (dashed line) converted from the exit route 1020. As illustrated, the sharp corners 1132, 1134, and 1136 are converted into rounded corners 1142, 1144, and 1146, respectively, so that the autonomous vehicle may be able to execute the turns.

According to some embodiments, the area coverage planner can also generate a velocity profile for the traversable trajectory. The velocity profile can specify a speed for the autonomous vehicle at each respective point along the traversable trajectory. For example, the velocity profile can specify a work speed for the segments along the tracks, and specify a turn speed along turns. The turn speed is usually slower than the work speed. The velocity profile can specify transition speeds for the transitions from the work speed to the turn speed, or vice versa. The transition speeds can be determined based on the nominal acceleration of the autonomous vehicle.

FIGS. 12A-12C illustrate an exemplary velocity profile for the trajectory 810 shown in FIG. 8. In FIG. 12A, the velocity profile is represented by dots of various sizes, the larger the dots, the slower the speed. As illustrated, the speed is substantially uniform along the segments of the tracks 620 (the uniform dots may appear as continuous lines), and is slower along the turns. FIG. 12B shows a close-up view of the velocity profile for the area 1210 shown in FIG. 12A. FIG. 12C shows a close-up view of the velocity profile for the area 1220 shown in FIG. 12A. In FIGS. 12B and 12C, the dots are shown in equal time interval along the trajectory. Thus, the dots would appear to be uniformly spaced from each other if the speed is constant, and would appear to be closer to each other if the speed is decreased.

FIG. 12B includes the velocity profile along two adjacent tracks 620p and 620q. There is an obstacle 230a between the two tracks 620p and 620q. The track 620p does not intercept the obstacle 230a, whereas the track 620q intercepts the obstacle 230a. As illustrated in FIG. 12B, the speed along the track 620p is nearly constant (e.g., at work speed), as indicated by the uniform spacing between adjacent dots. In comparison, the trajectory along the track 620q includes a turn in order to get around the obstacle 230a. As illustrated in FIG. 12B, the speed along the track 620q slows down during the turns, as indicated by the reduced spacing between adjacent dots.

FIG. 12C includes the velocity profile for the end-of-row turn from one track 620r to a next track 620s. In this example, the trajectory for the turn has a "U" shape, including a section along the headland guideline 220. Other types of end-of-row-turns are also possible, e.g., as described in U.S. patent application Ser. Nos. 16/863,056 and 16/863, 049, the contents of which are incorporated by reference. As illustrated in FIG. 12C, the speed is reduced around the corners of the trajectory when transitioning from the track 620r to the headland guideline 220, and from the headland guideline 220 to the next track 620s.

Figure 13A:
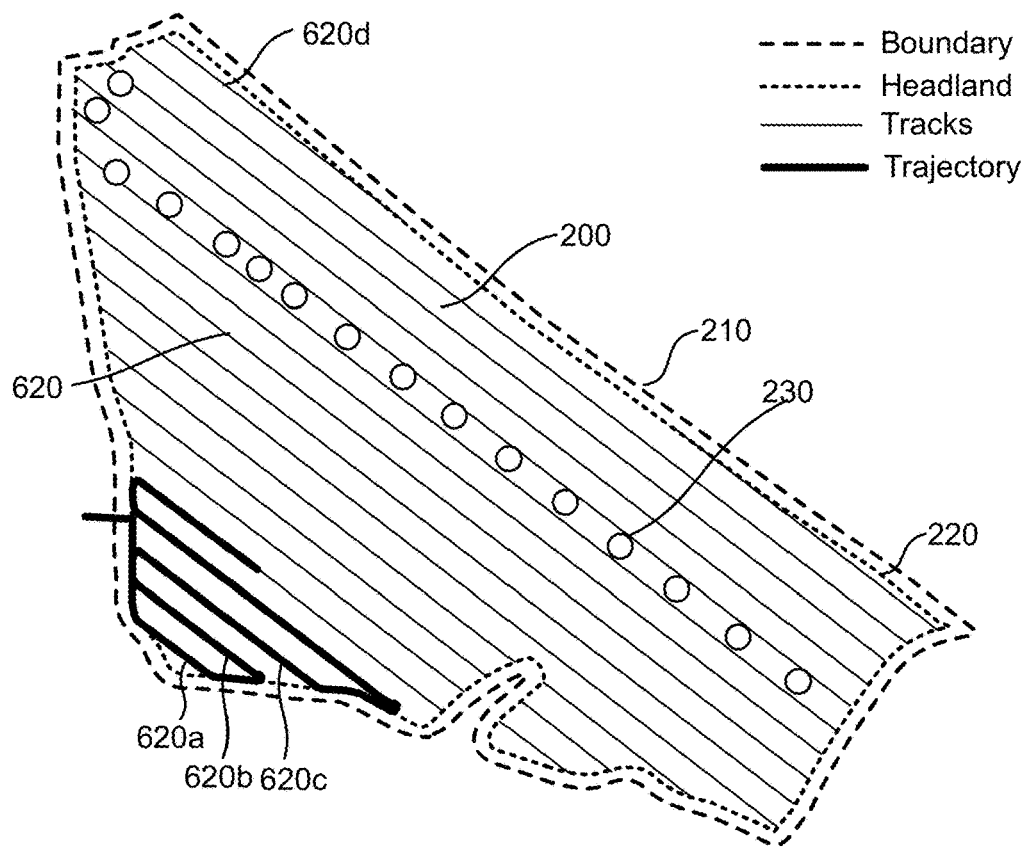
FIGS. 13A and 13B illustrate two exemplary track traversing strategies according to some embodiments.
Figure 13B:
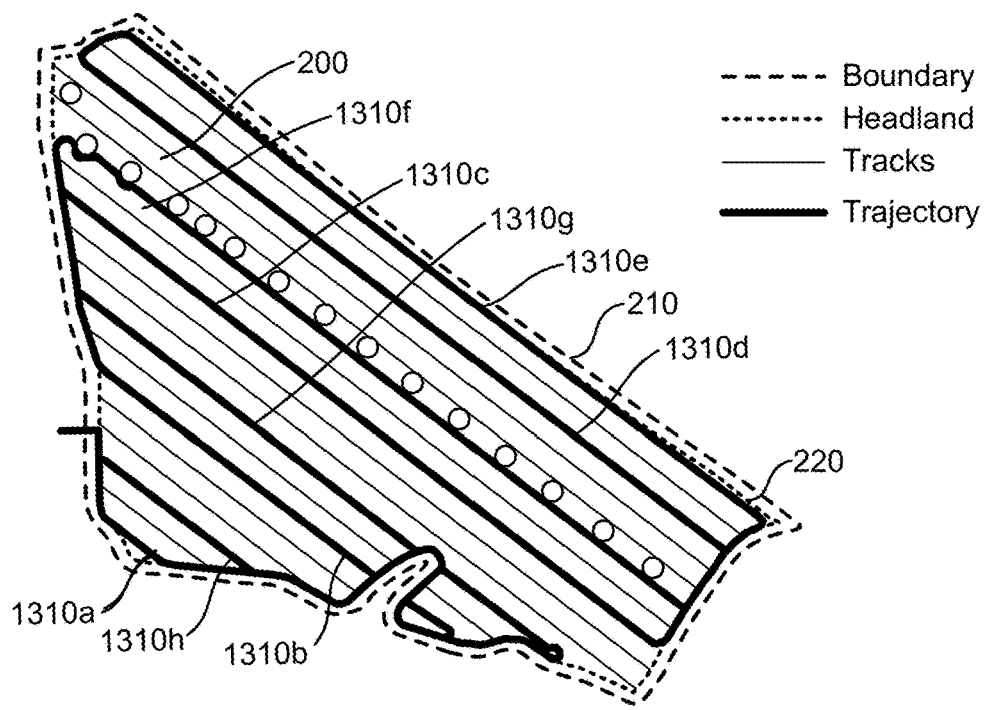

According to some embodiments, the tracks can be traversed according to various strategies. FIGS. 13A and 13B illustrate two exemplary strategies. The thick black line indicates the trajectory. In the example shown in FIG. 13A, the tracks 620 are traversed sequentially. For example, after completing the first track 620a, the next adjacent track 620b is traversed, followed by the next adjacent track 620c, and so on and so forth, until the last track 620d is completed.

Figure 14A:
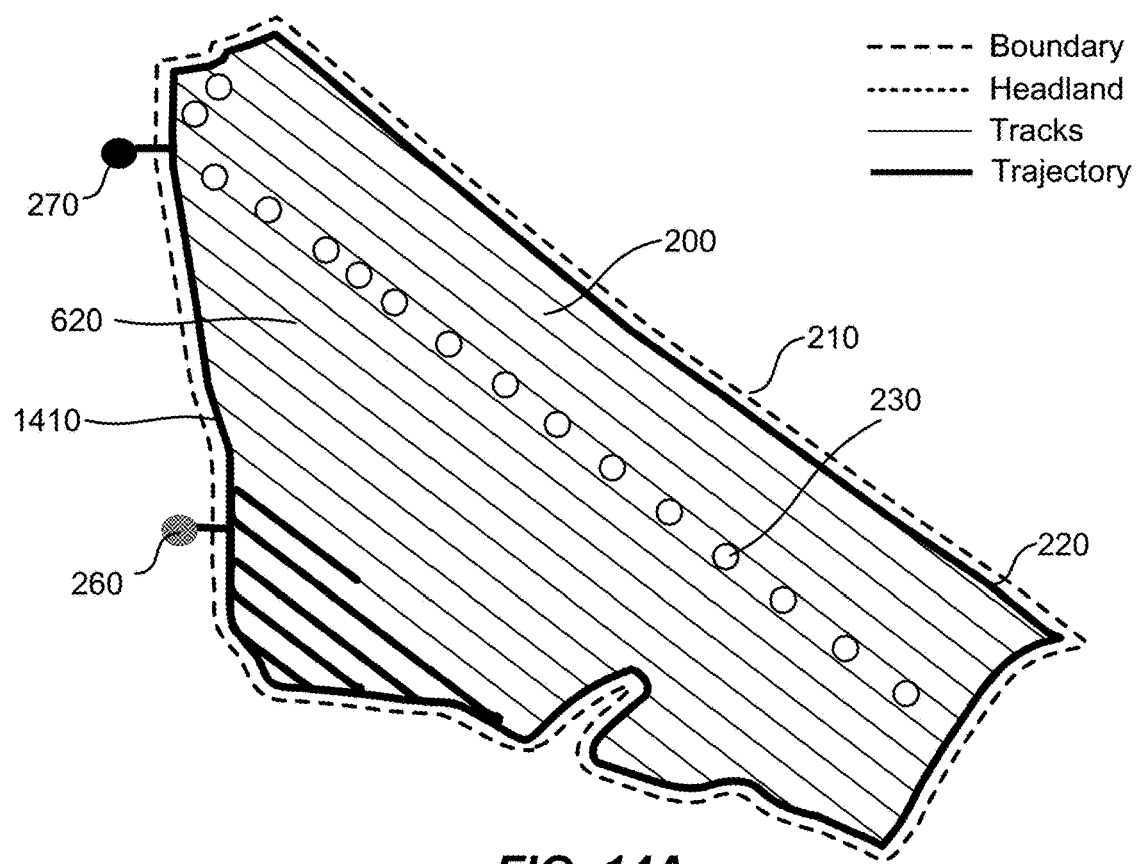
FIGS. 14A and 14B illustrate two examples of headland pass strategies according to some embodiments.
Figure 14B:
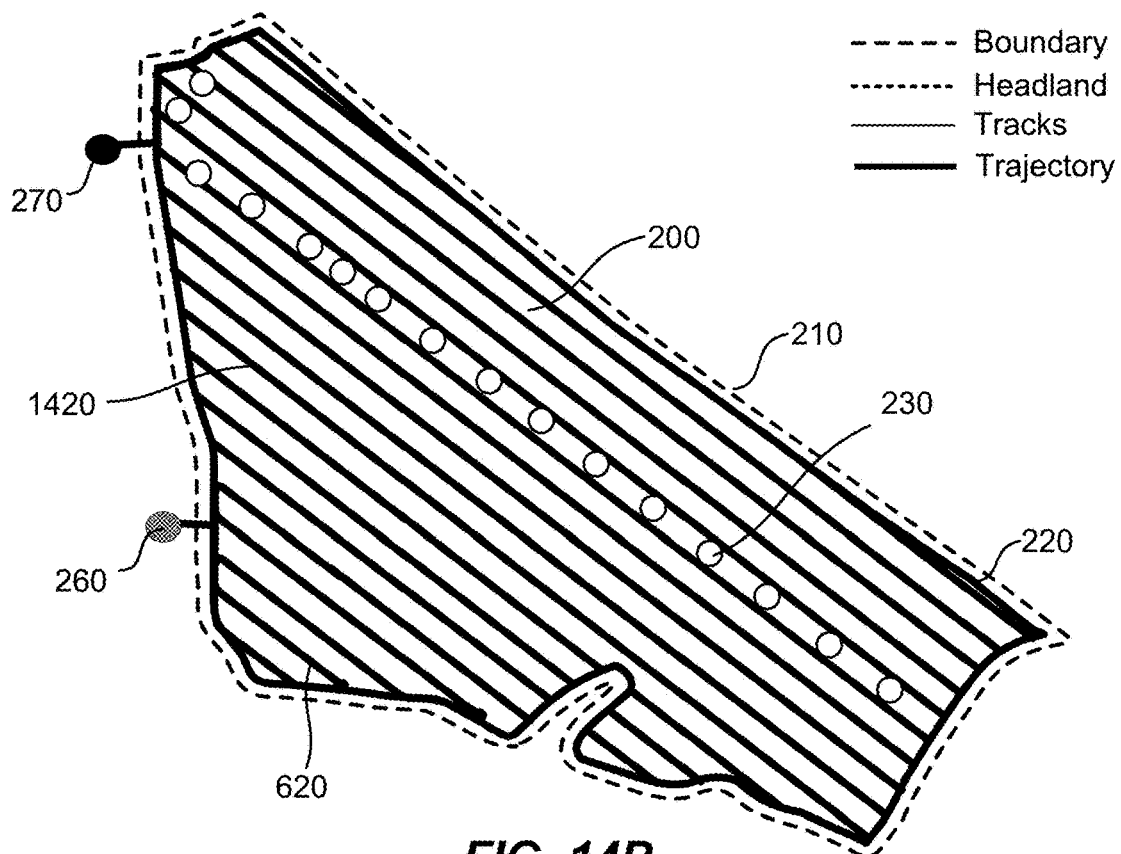

In the example shown in FIG. 13B, the tracks 620 are traversed in a "race track" pattern. For example, after completing the first track 1310a, the next track to be traversed is the sixth track 1310b, skipping four tracks in between. The trajectory can follow the headland guideline 220 when transitioning from the first track 1310a to the sixth track 1310b. After completing the sixth track 1310b, the next track to be traversed is the 11th track 1310c, again skipping four tracks in between. After the 11th track 1310c is completed, the next track to be traversed is the 16th track 1310d, again skipping four tracks in between. After the 16th track 1310d is traversed, the next track to be traversed is the last track 1310e (the 18th track). It then repeats the pattern of skipping four tracks by traversing the tracks 1310f, 1310g, and 1310h, in this order. Compared to the sequential strategy, the "race track" strategy can have the advantage that the turns from one track to a next track are wider. The trajectory can traverse the tracks in other non-sequential patterns.

illustrated in FIG. 8, the headland 220 in the periphery of the field 200 may not be covered. According some embodiments, the area coverage planner can include a headland pass in the trajectory. FIGS. 14A and 14B illustrate two examples. In the example shown in FIG. 14A, the trajectory 1410 (represented by the thick black line) can start from the entry point 260 onto the headland guideline 220, and then traverse the entire headland guideline 220 before starting to traverse the tracks 620. In the example shown in FIG. 14B, the trajectory 1420 (represented by the thick black line) traverse the tracks 620 first (the tracks are overlaid with the trajectory 1320, and therefore are not visible), and then traverse the entire headland guideline 220 before going to the exit point 270. According to some embodiments, a user can be presented with three options: (i) headland pass on entry, (ii) headland pass on exit, and (iii) no headland pass. For example, the three options can be presented to the user on a graphics user interface (GUI). The user can select one of them.

Figure 15A:
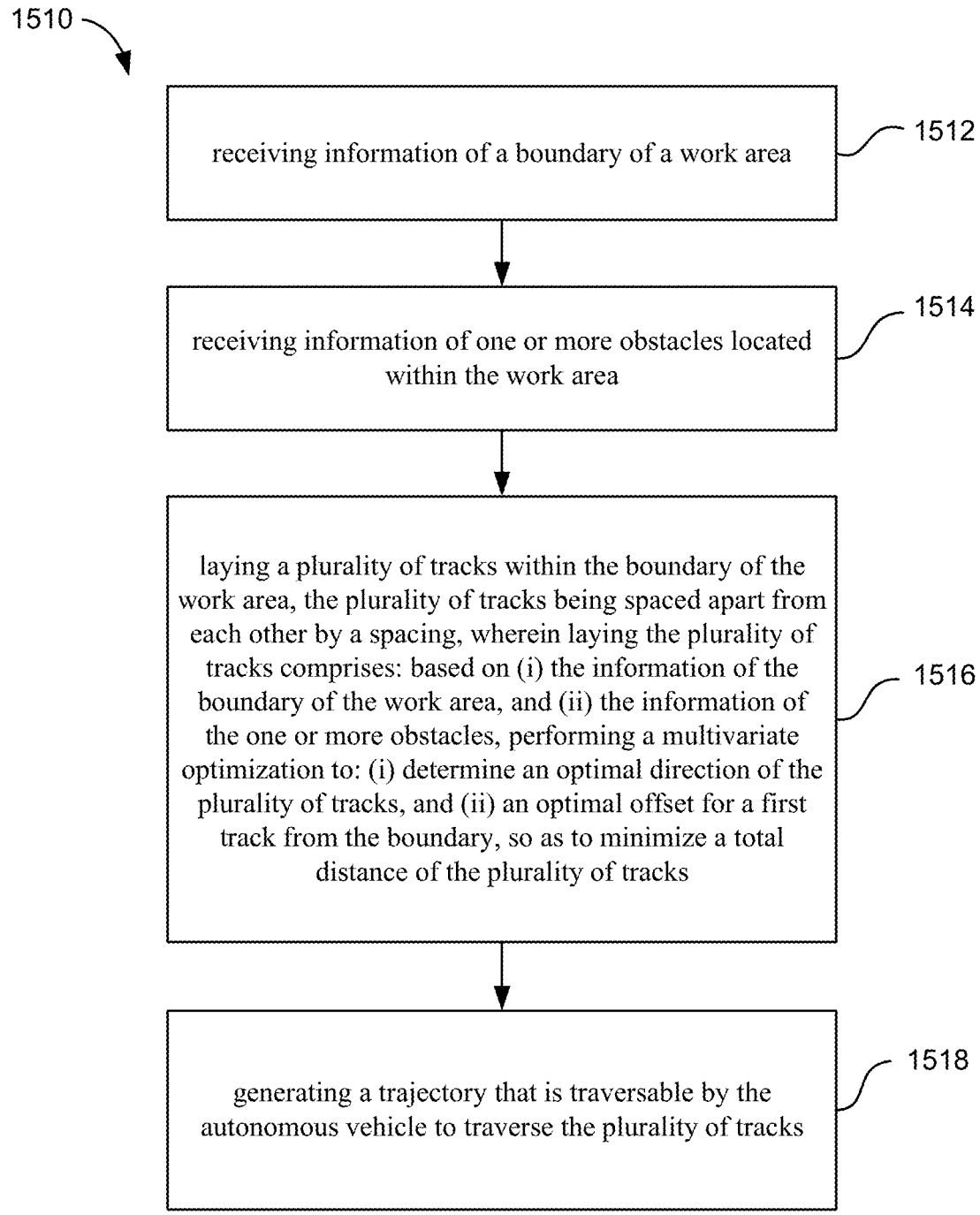
FIG. 15A shows a simplified flowchart illustrating a method of area coverage planning for an autonomous vehicle according to some embodiments.

FIG. 15A shows a simplified flowchart illustrating a method 1510 of area coverage planning for an autonomous vehicle according to some embodiments.

The method 1510 includes, at 1512, receiving information of a boundary of a work area; and at 1514, receiving information of one or more obstacles located within the work area. The method 1510 further includes, at 1516, laying a plurality of tracks within the boundary of the work area. The plurality of tracks are spaced apart from each other by a spacing. Laying the plurality of tracks comprises: based on (i) the information of the boundary of the work area, and (ii) the information of the one or more obstacles, performing a multivariate optimization to: (i) determine an optimal direction of the plurality of tracks, and (ii) an optimal offset for a first track from the boundary, so as to minimize a total distance of the plurality of tracks. The method 1510 further includes, at 1518 generating a trajectory that is traversable by the autonomous vehicle to traverse the plurality of tracks.

It should be appreciated that the specific steps illustrated in FIG. 15A provide a particular method of area coverage planning for an autonomous vehicle according to some embodiments. Other sequences of steps may also be performed according to alternative embodiments. For example, alternative embodiments of the present invention may perform the steps outlined above in a different order. Moreover, the individual steps illustrated in FIG. 15A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 15B:
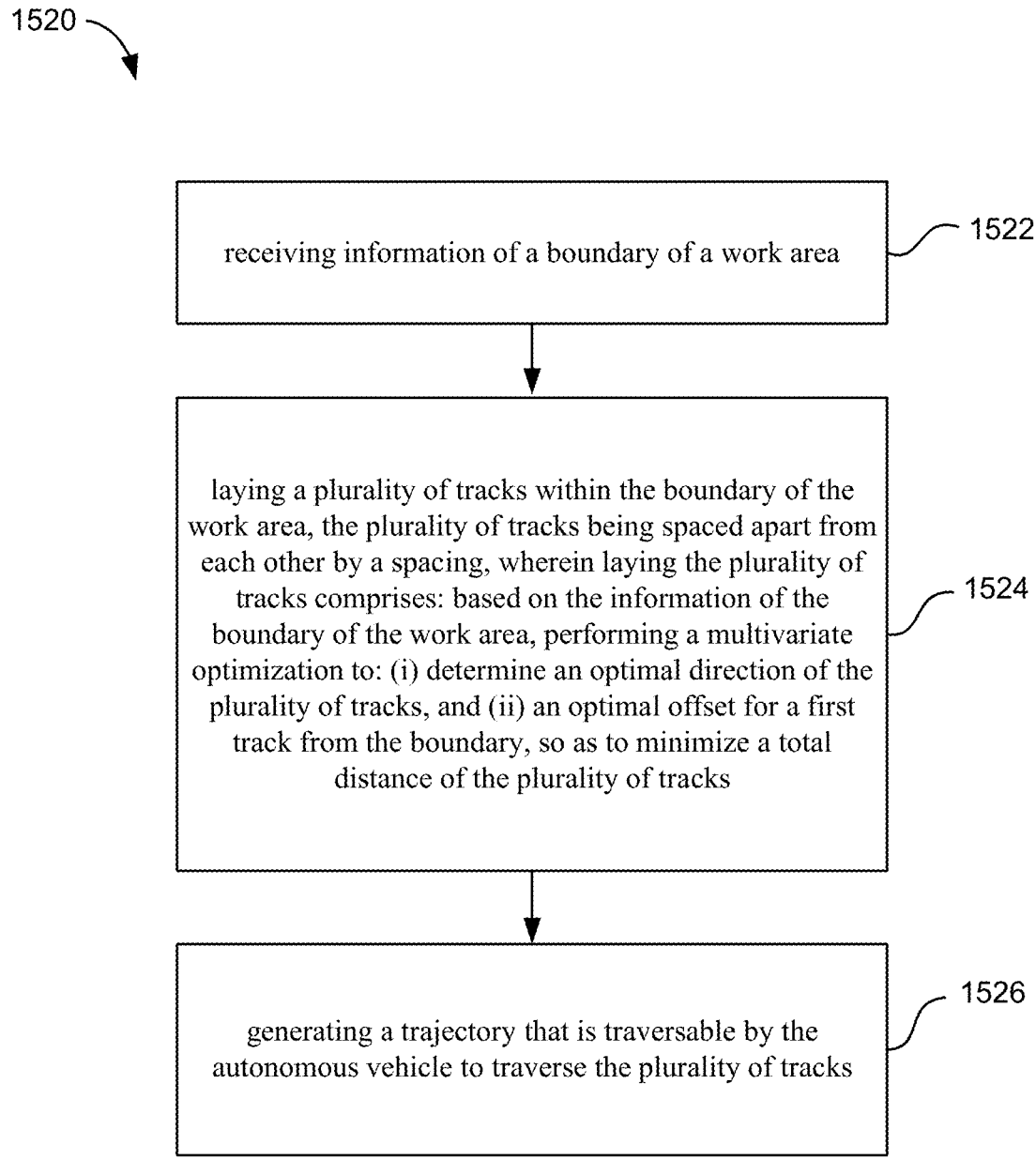
FIG. 15B shows a simplified flowchart illustrating a method of area coverage planning for an autonomous vehicle according to some embodiments.

FIG. 15B shows a simplified flowchart illustrating a method 1520 of area coverage planning for an autonomous vehicle according to some embodiments.

The method 1520 includes, at 1522, receiving information of a boundary of a work area; and at 1524, laying a plurality of tracks within the boundary of the work area. The plurality of tracks are spaced apart from each other by a spacing. Laying the plurality of tracks comprises: based on the information of the boundary of the work area, performing a multivariate optimization to: (i) determine an optimal direction of the plurality of tracks, and (ii) an optimal offset for a first track from the boundary, so as to minimize a total distance of the plurality of tracks. The method 1520 further includes, at 1526 generating a trajectory that is traversable by the autonomous vehicle to traverse the plurality of tracks.

It should be appreciated that the specific steps illustrated in FIG. 15B provide a particular method of area coverage planning for an autonomous vehicle according to some embodiments. Other sequences of steps may also be performed according to alternative embodiments. For example, alternative embodiments of the present invention may perform the steps outlined above in a different order. Moreover, the individual steps illustrated in FIG. 15B may include multiple sub-steps that may be performed in various sequences as appropriate to the individual step. Furthermore, additional steps may be added or removed depending on the particular applications. One of ordinary skill in the art would recognize many variations, modifications, and alternatives.

For some applications, such as fertilizer spraying and seed spraying, the autonomous vehicle may need to be replenished with consumable materials (e.g., fertilizer or seeds) during the coverage of a work area. According to some embodiments, an area coverage planner can include replenishment planning during coverage. After a coverage trajectory (e.g., a single traversable trajectory covering the entire work area) has been generated, logistic points along the coverage trajectory at which the autonomous vehicle needs to be replenished can be computed according to a strategy. Provided with the locations of one or more refill stations adjacent to the boundary of the work area, the replenishment planner can generate a replenishment trajectory for each logistic point. The replenishment trajectory includes a first part from the logistic point to a refill station, and a second part from the refill station to a resume point.

Figure 16:
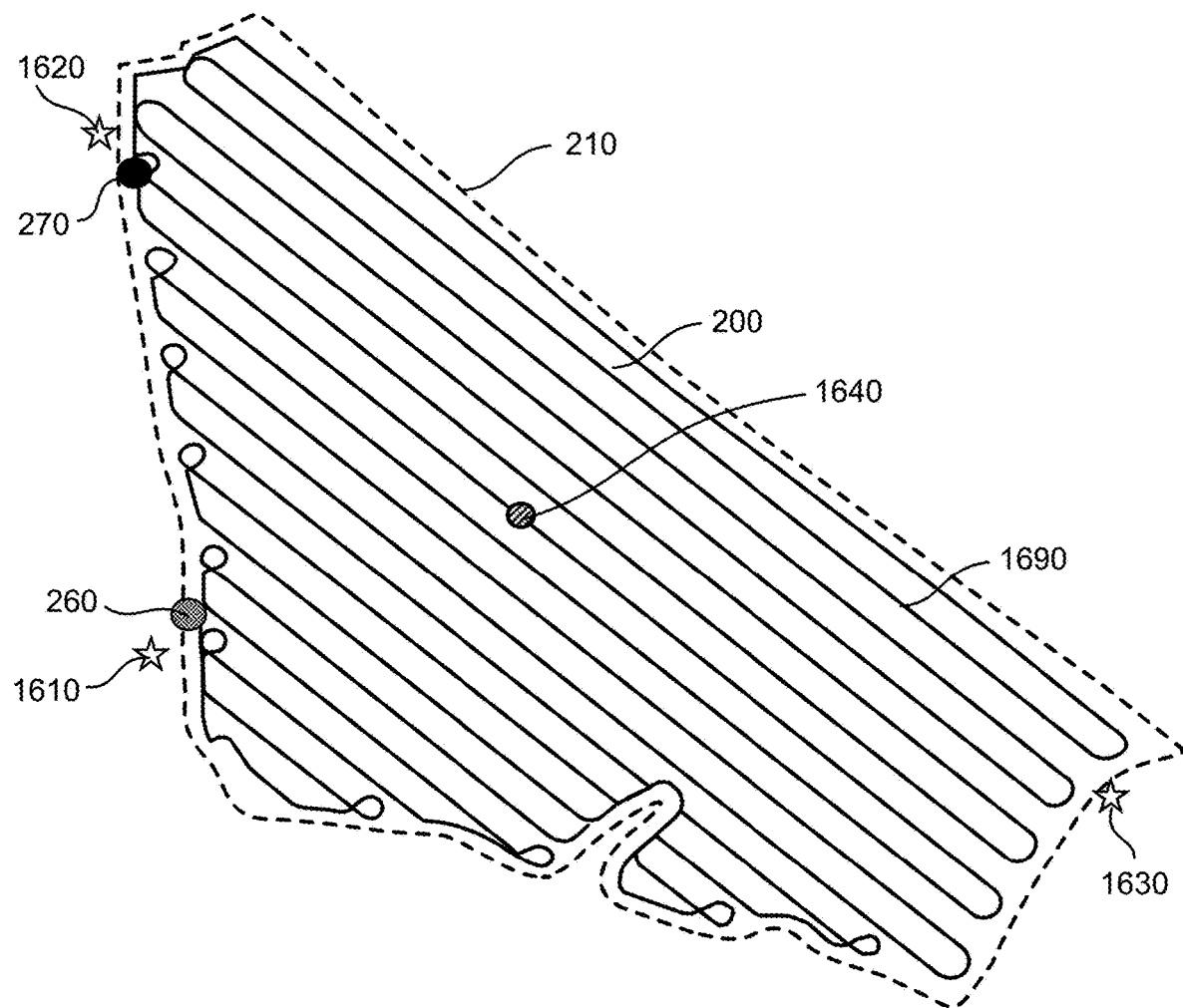
FIG. 16 shows a field with refill stations for replenishing materials.

FIG. 16 shows a field 200 with several refill stations. For example, a first refill station 1610 can be located adjacent the entry point 260, the second refill station 1620 can be located adjacent the exit point 270, and a third refill station 1630 can be located adjacent the boundary 210 on the other side of the field 200. The solid line indicates a trajectory 1690 for an autonomous vehicle to traverse the tracks to cover the field 200, which can be referred herein as a coverage trajectory. While traversing the coverage trajectory 1690, the autonomous vehicle can run out of the material at certain points (e.g., at the point 1640). Thus, the autonomous vehicle may need to go to one of the refill stations 1610, 1620, or 1630 to be replenished with the material, before resuming the coverage trajectory.

According to some embodiments, the area coverage planner can first generate the coverage trajectory (e.g., a single traversable trajectory covering the entire field 200 while avoiding obstacles), using the methods discussed above. The area coverage planner can compute logistic points along the coverage trajectory where the autonomous vehicle would need to be replenished with the material. The area coverage planner can then generate a traversable trajectory from each respective logistic point to a respective refill station, and then from the respective refill station to a corresponding resume point. The trajectory from a logistic point to a refill station, and from the refill station to a resume point can be referred to as a replenishment trajectory.

The logistic points can be computed according to various strategies according to some embodiments. One strategy is to compute the logistic points based on threshold. In this strategy, a logistic point can be a point at which the remaining load of the material falls below a predetermined threshold. This strategy can be referred to as trigger at threshold. The threshold can be a percentage of a nominal full load (e.g., 20% of the nominal full load), or can be an absolute amount of the material (e.g., 100 liters, assuming a nominal full load of 500 liters). Assuming a nominal consumption rate of the material (e.g., in liters per meter) is known and the autonomous vehicle is filled to the nominal full load each time it is refilled, a logistic point can be computed based on the distance the autonomous vehicle has traveled since the last refill based on the nominal consumption rate. In some embodiments, assuming that the autonomous vehicle stops consuming the material (e.g., stop spraying fertilizer or seeds) when it makes an end-of-row-turn, the distance traveled during end-of-row-turns can be excluded in the calculation.

Figure 17:
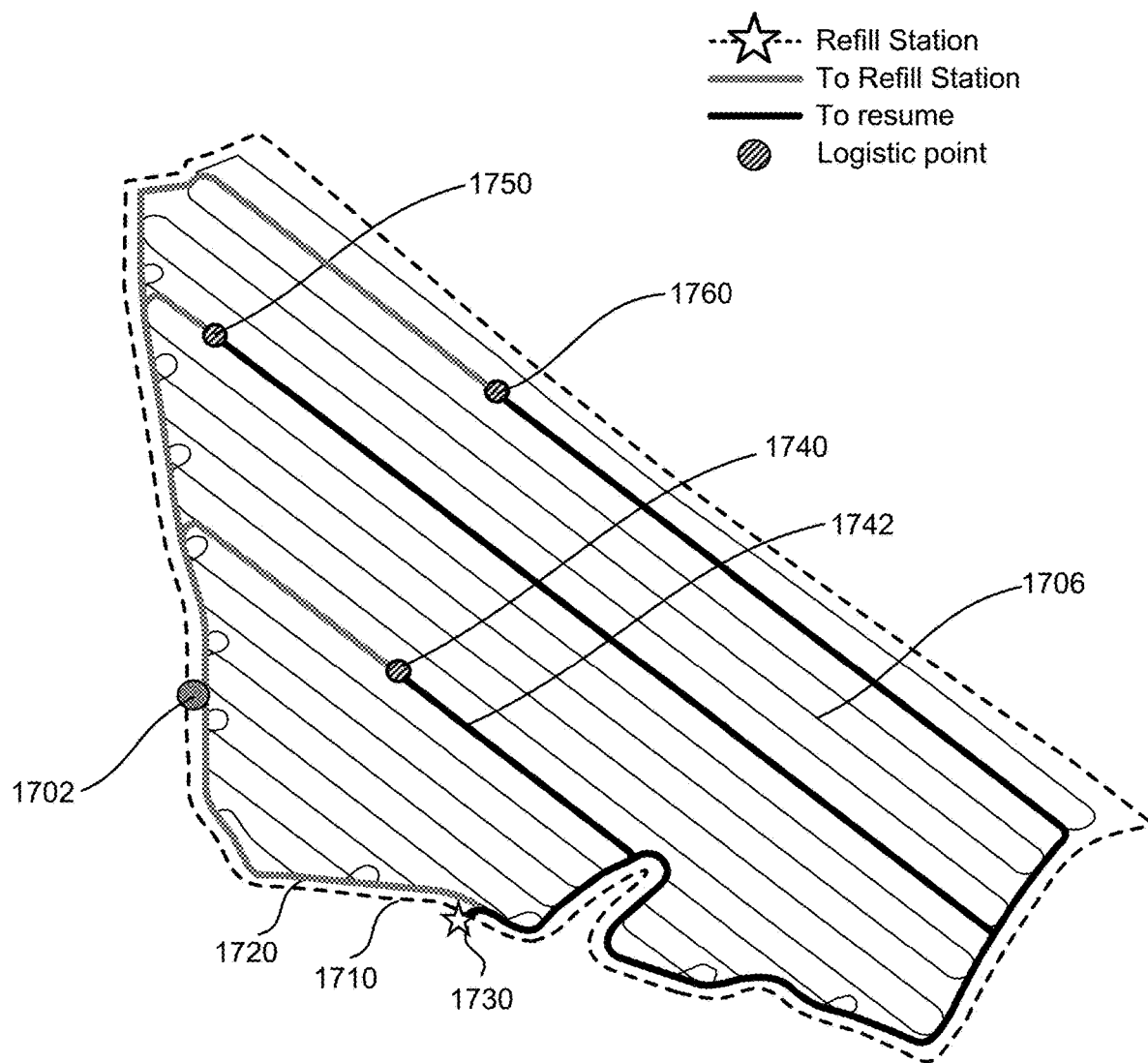
FIG. 17 illustrates the strategy of trigger at threshold for computing logistic points according to some embodiments.

FIG. 17 illustrates the strategy of trigger at threshold according to some embodiments. A refill station 1730 is located adjacent to the boundary 1710. Assume that the coverage trajectory 1760 (thin solid line) traverses the tracks sequentially, starting from the entry point 1702. It can be computed that a first logistic point will be reached at the location 1740. When the first logistic point 1740 is reached, the autonomous vehicle will need to go to the refill station 1730 to be replenished with the material. For example, the autonomous vehicle can continue to the end of the track 1742, and then follow the headland guideline 1720 to the refill station 1730 (along the thick grey line). After the refill, the autonomous vehicle can follow the headland guideline 1720 to the track 1742, and then along the track 1742 back to the first logistic point 1740 (along the thick black line). The autonomous vehicle can then resume work by traversing along the coverage trajectory 1760 from the first logistic point 1740. In this case, the logistic point is also the resume point. The trajectory from the first logistic point 1740 to the refill station 1730 (along the thick grey line), and from the refill station 1730 back to the first logistic point 1740 (along the thick black line) is referred to as a replenishment trajectory.

Additional logistic points (e.g., the logistic points 1750 and 1760) can be computed in a similar manner, and the associated replenishment trajectories from each logistic point to the refill station 1730 (along the thick grey line) and from the refill station 1730 to the corresponding resume point (along the thick black line) can be determined. While the autonomous vehicle is traversing the replenishment trajectory (e.g., along the thick grey line and the thick black line), the autonomous vehicle can stop consuming the material (e.g., stop spraying fertilizer or seeds).

Another strategy is to compute logistic points at end-of-row according to some embodiments. In this strategy, a logistic point is always at the end of a track. For example, the replenishment planner can compute a logistic point to be at the end of a track, beyond which the autonomous vehicle may not have enough material to last through the next track. FIGS. 18A-18D illustrate some examples.

Figure 18A:
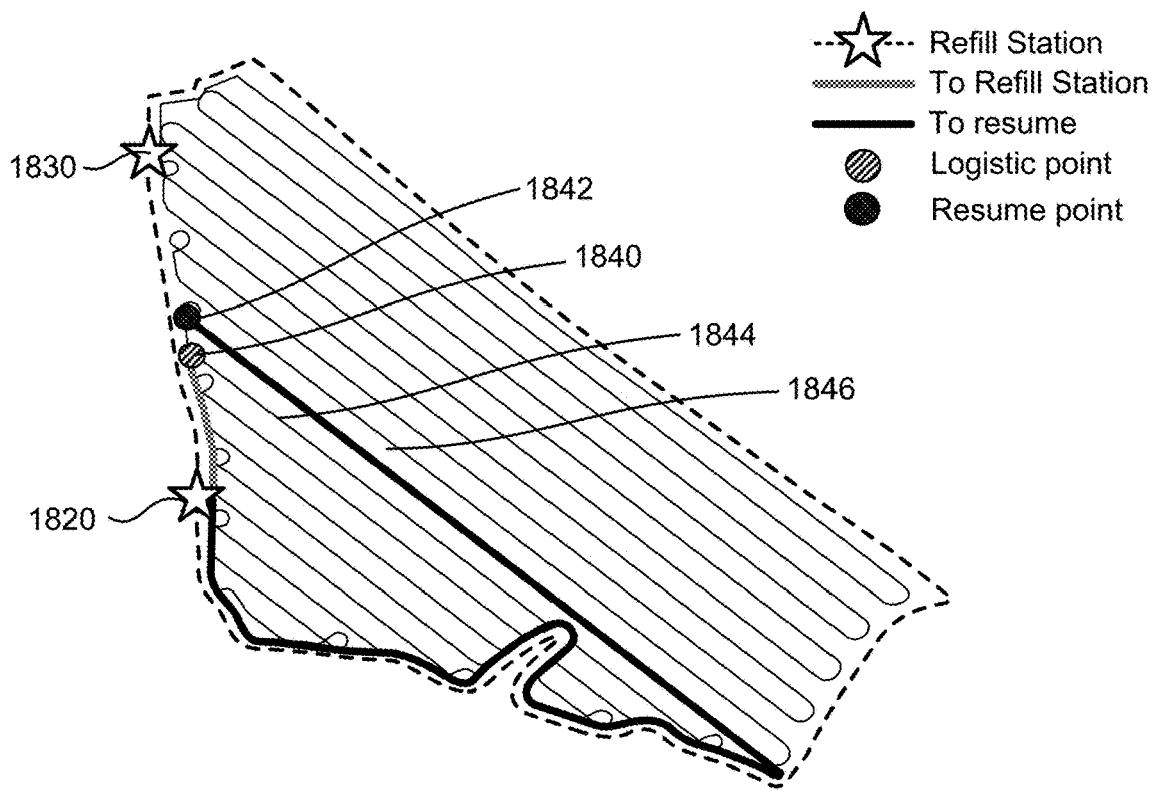
FIGS. 18A-18D illustrate the strategy of trigger at end-of-row for computing logistic points according to some embodiments.

Referring to FIG. 18A, a first logistic point 1840 can be computed to be at the end of the track 1844. After the autonomous vehicle has completed the track 1844, it would not have enough material to last through the next track 1846. Thus, the autonomous vehicle would need to go to one of the refill stations 1820 and 1830 to be replenished with the material. The replenishment planner can generate a replenishment trajectory from the logistic point 1840 to a first refill station 1820 (along the thick grey line), and after the refill, from the first refill station 1820 to the beginning of the next track 1846 (along the thick black line). The beginning of the next track 1846 is the resume point 1842.

Figure 18B:
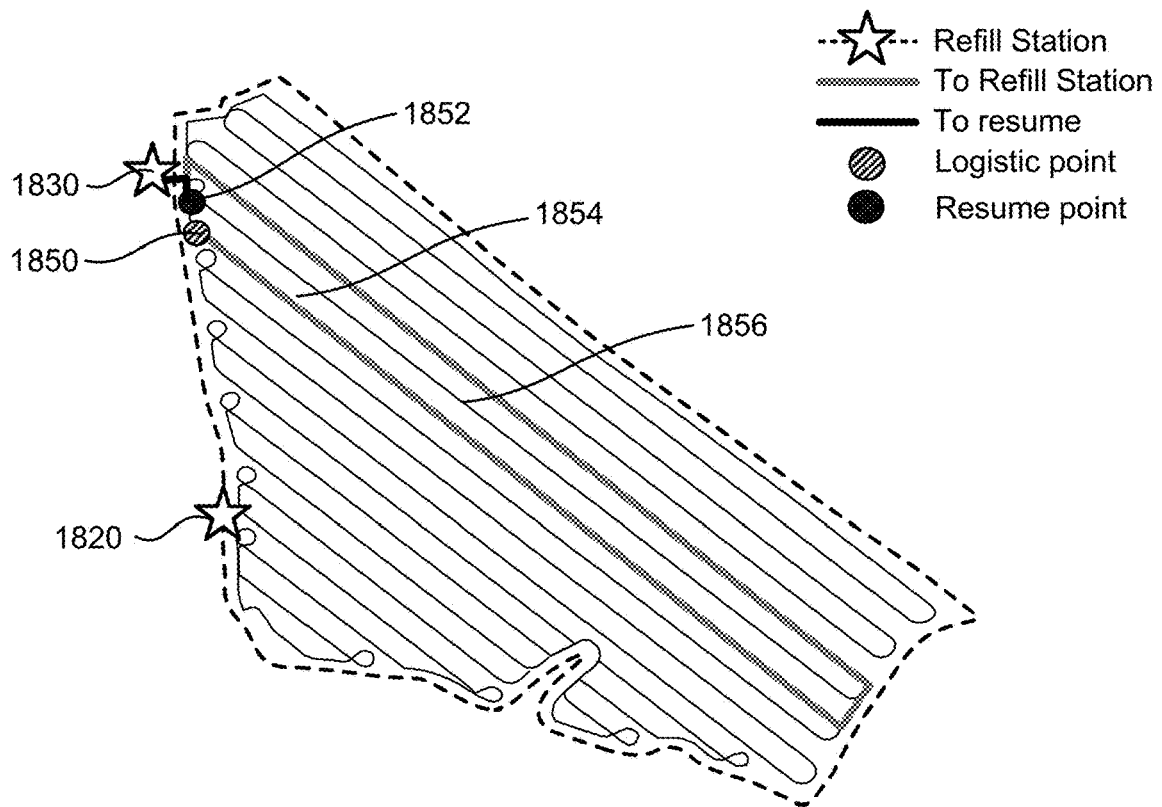

Referring to FIG. 18B, a second logistic point 1850 can be computed to be at the end of the track 1854. The replenishment planner can generate a replenishment trajectory from the second logistic point 1850 to the second refill station 1830 (along the thick grey line), and after the refill, from the second refill station 1830 to the resume point 1852 at beginning of the next track 1856 (along the thick black line).

Figure 18C:
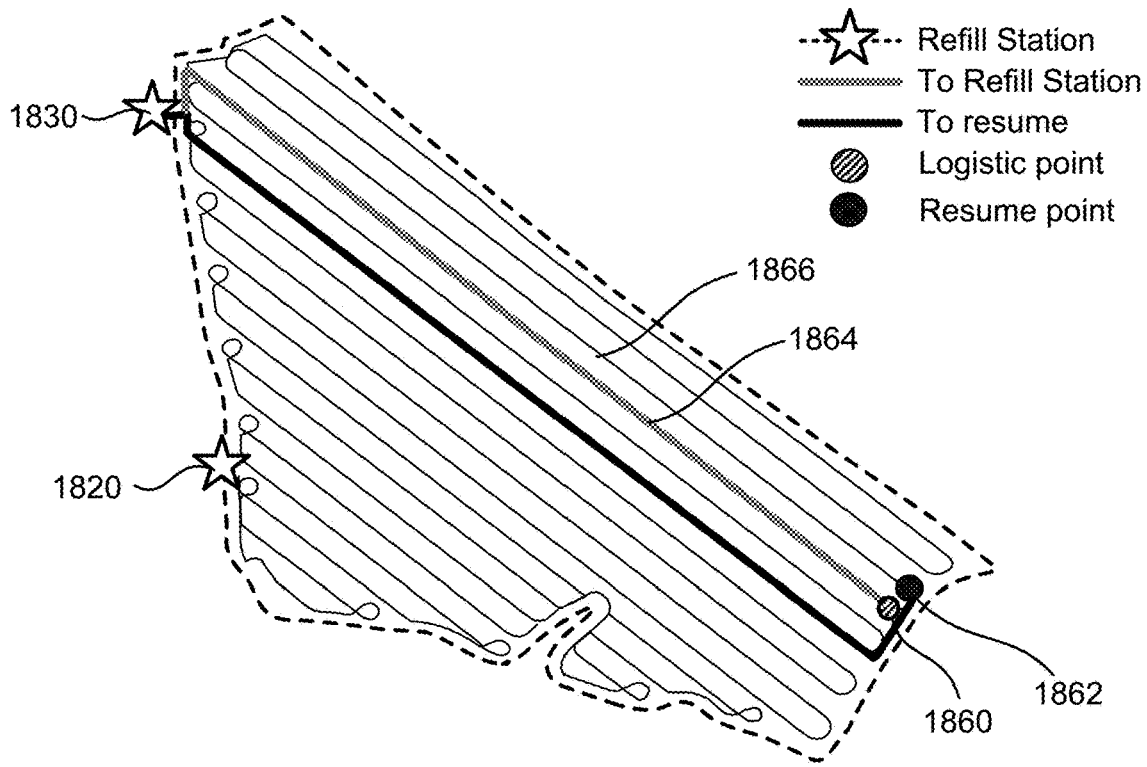

Referring to FIG. 18C, a third logistic point 1860 can be computed to be at the end of the track 1864. The replenishment planner can generate a replenishment trajectory from the third logistic point 1860 to the second refill station 1830 (along the thick grey line), and after the refill, from the second refill station 1830 to the resume point 1862 at the beginning of the next track 1866 (along the thick black line).

Figure 18D:
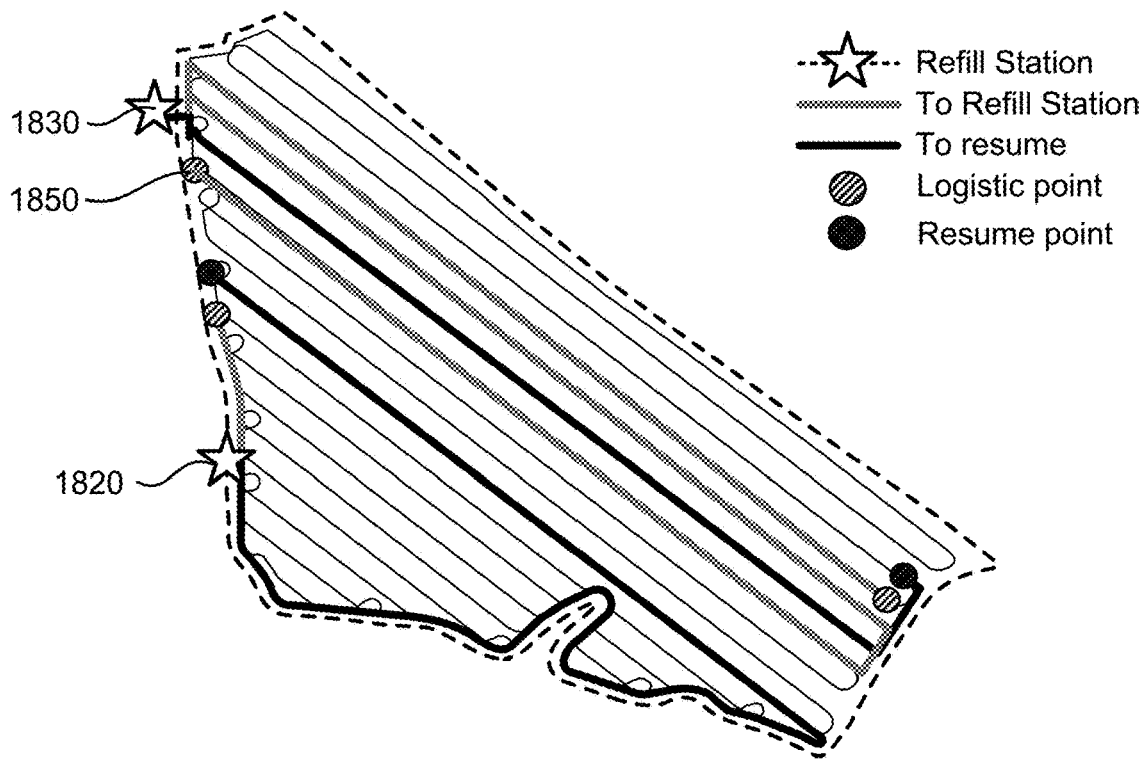

FIG. 18D shows all three replenishment trajectories. As illustrated, in the strategy of trigger at end-of-row, the logistic point is always at the end of a track, and the resume point is always at the beginning of a next track. While the autonomous vehicle is traversing a replenishment trajectory (e.g., along the thick grey line and the thick black line), the vehicle can stop consuming the material (e.g., stop spraying fertilizer or seeds).

Figure 19:
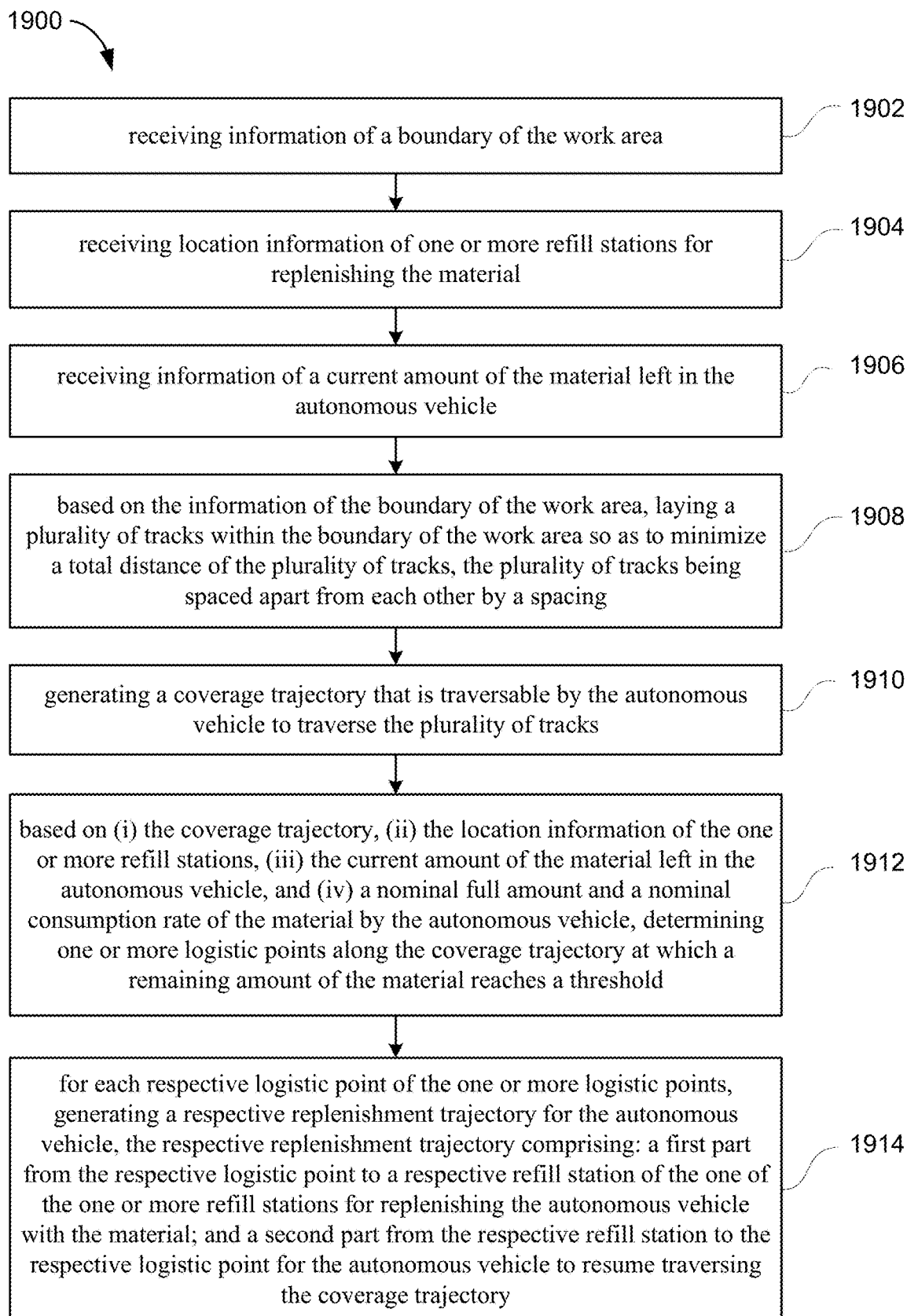
FIG. 19 shows a simplified flowchart illustrating a method of area coverage planning with replenishment planning for an autonomous vehicle according to some embodiments.

FIG. 19 shows a simplified flowchart illustrating a method 1900 of area coverage planning with replenishment planning for an autonomous vehicle according to some embodiments.

The method 1900 includes, at 1902, receiving information of a boundary of the work area; at 1904, receiving location information of one or more refill stations for replenishing the material; and at 1906, receiving information of a current amount of the material left in the autonomous vehicle. The method 1900 further includes, at 1908, based on the information of the boundary of the work area, laying a plurality of tracks within the boundary of the work area so as to minimize a total distance of the plurality of tracks. The plurality of tracks are spaced apart from each other by a spacing. The method 1900 further includes, at 1910, generating a coverage trajectory that is traversable by the autonomous vehicle to traverse the plurality of tracks.

The method 1900 further includes, at 1912, based on (i) the coverage trajectory, (ii) the location information of the one or more refill stations, (iii) the current amount of the material left in the autonomous vehicle, and (iv) a nominal full amount and a nominal consumption rate of the material by the autonomous vehicle, determining one or more logistic points along the coverage trajectory at which a remaining amount of the material reaches a threshold. The method 1900 further includes, at 1914, for each respective logistic point of the one or more logistic points, generating a respective replenishment trajectory for the autonomous vehicle. The respective replenishment trajectory includes: a first part from the respective logistic point to a respective refill station of the one of the one or more refill stations for replenishing the autonomous vehicle with the material, and a second part from the respective refill station to the respective logistic point for the autonomous vehicle to resume traversing the coverage trajectory.

It should be appreciated that the specific steps illustrated in FIG. 19 provide a particular method of area coverage planning with replenishment planning for an autonomous vehicle according to some embodiments. Other sequences of steps may also be performed according to alternative embodiments. For example, alternative embodiments of the present invention may perform the steps outlined above in a different order. Moreover, the individual steps illustrated in FIG. 19 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 20:
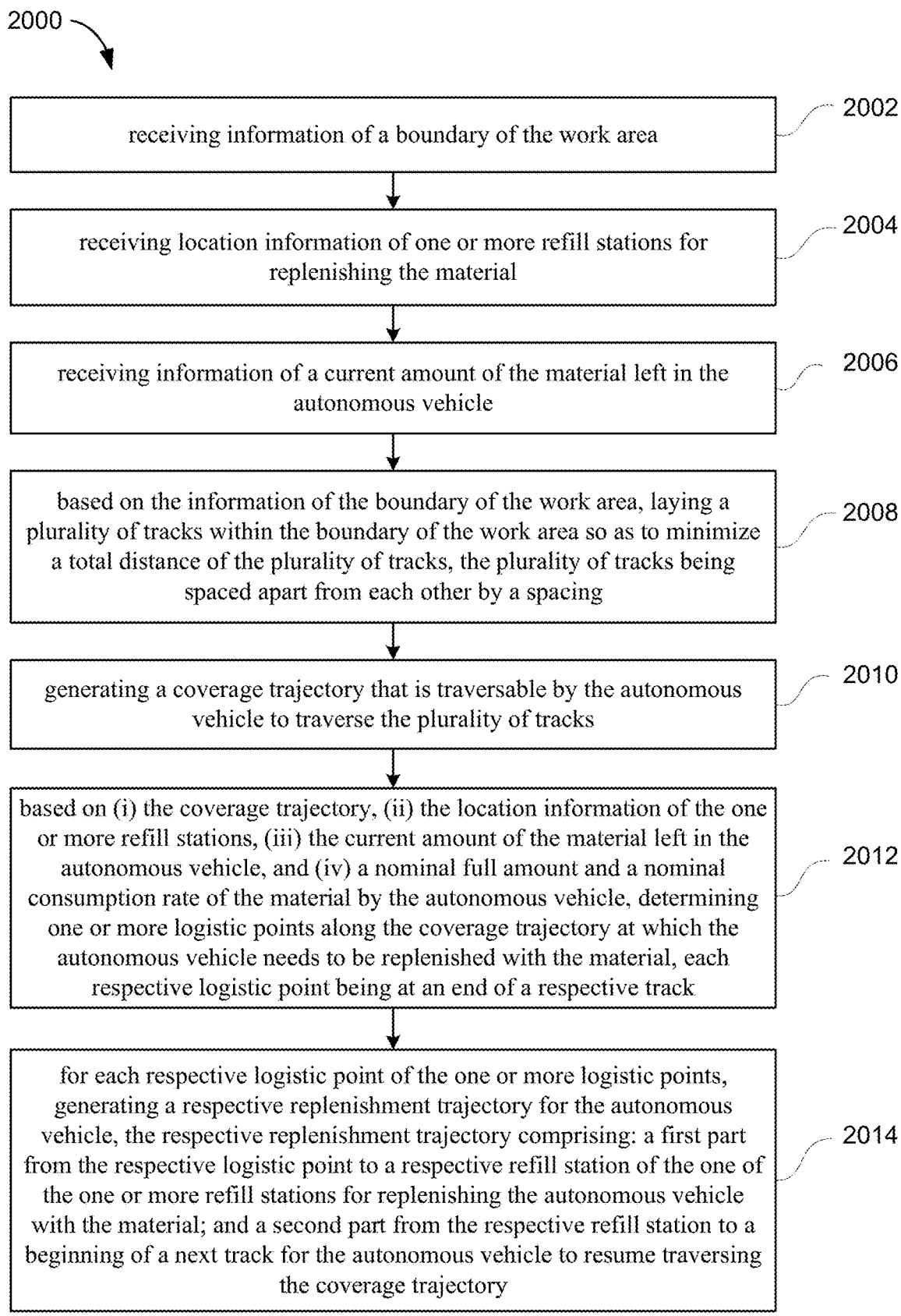
FIG. 20 shows a simplified flowchart illustrating a method of area coverage planning with replenishment planning for an autonomous vehicle according to some embodiments.

FIG. 20 shows a simplified flowchart illustrating a method 2000 of area coverage planning with replenishment planning for an autonomous vehicle according to some embodiments.

The method 2000 includes, at 2002, receiving information of a boundary of the work area; at 2004, receiving location information of one or more refill stations for replenishing the material; and at 2006, receiving information of a current amount of the material left in the autonomous vehicle. The method 2000 further includes, at 2008, based on the information of the boundary of the work area, laying a plurality of tracks within the boundary of the work area so as to minimize a total distance of the plurality of tracks. The plurality of tracks are spaced apart from each other by a spacing. The method 2000 further includes, at 2010, generating a coverage trajectory that is traversable by the autonomous vehicle to traverse the plurality of tracks.

The method 2000 further includes, at 2012, based on (i) the coverage trajectory, (ii) the location information of the one or more refill stations, (iii) the current amount of the material left in the autonomous vehicle, and (iv) a nominal full amount and a nominal consumption rate of the material by the autonomous vehicle, determining one or more logistic points along the coverage trajectory at which the autonomous vehicle needs to be replenished with the material. Each respective logistic point is at an end of a respective track. The method 2000 further includes, at 2014, for each respective logistic point of the one or more logistic points, generating a respective replenishment trajectory for the autonomous vehicle. the respective replenishment trajectory includes: a first part from the respective logistic point to a respective refill station of the one of the one or more refill stations for replenishing the autonomous vehicle with the material, and a second part from the respective refill station to a beginning of a next track for the autonomous vehicle to resume traversing the coverage trajectory.

It should be appreciated that the specific steps illustrated in FIG. 20 provide a particular method of area coverage planning with replenishment planning for an autonomous vehicle according to some embodiments. Other sequences of steps may also be performed according to alternative embodiments. For example, alternative embodiments of the present invention may perform the steps outlined above in a different order. Moreover, the individual steps illustrated in FIG. 20 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 21:
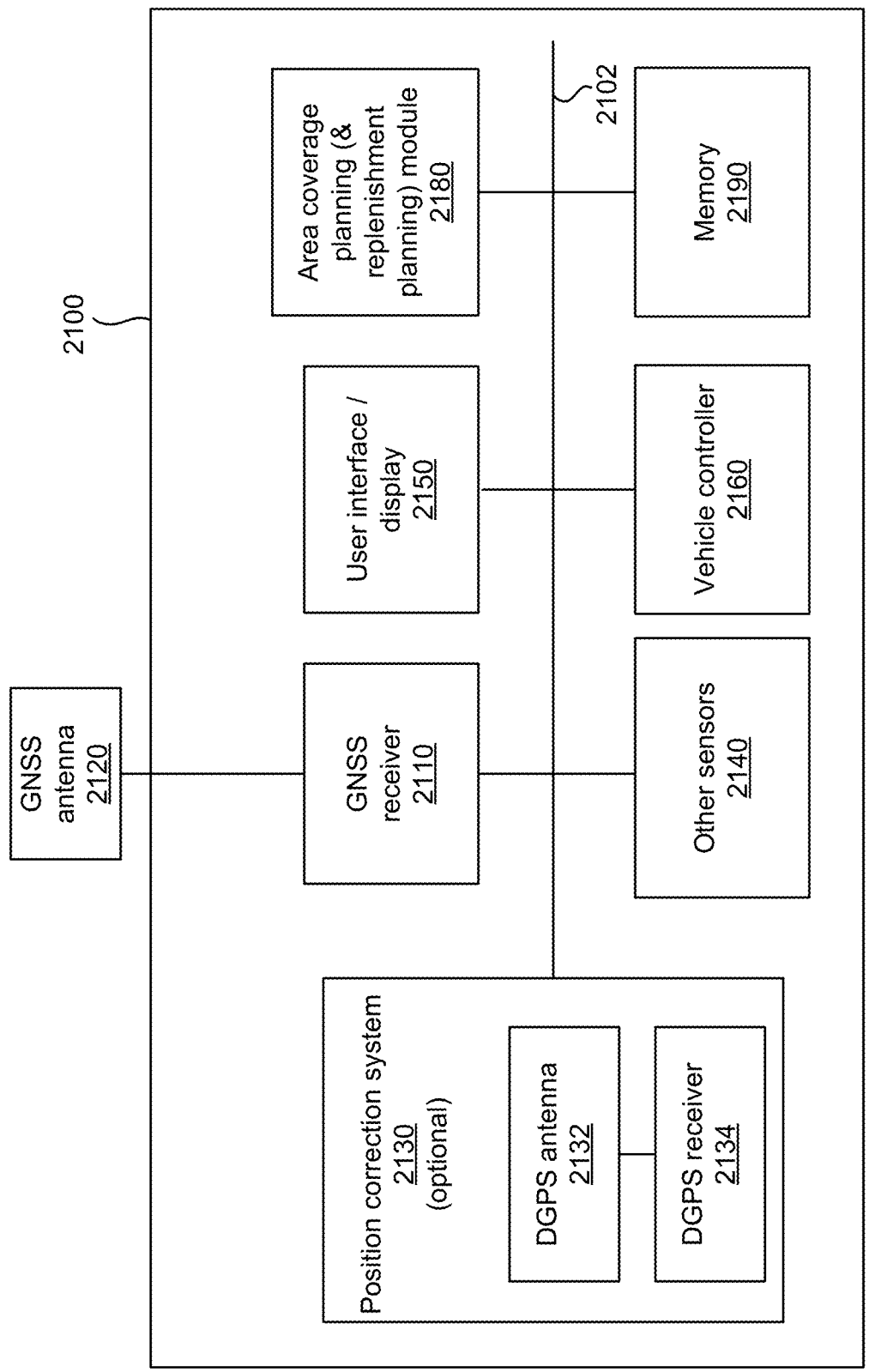
FIG. 21 shows a simplified diagram of a system for an autonomous vehicle according to some embodiments.

FIG. 21 shows a simplified diagram of a system 2100 for an autonomous vehicle according to some embodiments.

The system 2100 may include an area coverage planning module 2180, and a user interface 2150. In some embodiments, the user interface 2150 may also include a display.

The area coverage planning module 2180 can include one or more computer processors configured to perform area coverage planning according to the embodiments described above. The area coverage planning can include laying down the tracks and generating a traversable coverage trajectory for the autonomous vehicle. In some embodiments, the area coverage planning module 2180 can also perform replenishment planning according to the embodiments described above. Replenishment planning can include computing logistic points according to various strategies, and generating replenishment trajectories. In some embodiments, the coverage trajectory and the replenishment trajectories can be displayed in a display (e.g., the display in the user interface 2150).

The system 2100 can include a memory 2190. The memory 2190 can store information needed for the area coverage planning module 2180, as well as other information. For example, the memory 2190 can store information about a work area, such as a boundary (e.g., a geofence) and headland guidelines. The memory 2190 can also store information of any static obstacles located within the boundary, the location of an entry point, and the location of an exit point. The memory 2190 can also store information of the locations of one or more refill stations. The memory 2190 can also store information about the nominal full load of a material that the autonomous vehicle may spray along the coverage trajectory, and the nominal consumption rate of the material, as well as a threshold load for triggering a logistic point. The memory 2190 can also store computer-executable instructions to be executed by the computer processors of the area coverage planning module 2180. The memory 2190 may comprise a volatile memory random access memory (RAM), or non-volatile data storage device such as a hard disk drive, flash memory or other optical or magnetic storage device. In some embodiments, the area coverage planning module 2180 may include its own memory.

The system 2100 may include a global navigation satellite systems (GNSS) antenna 2120 attached to the autonomous vehicle, and a GNSS receiver 2110 coupled to the GNSS antenna 2120. The GNSS receiver 2110 may be configured to determine a current position of the vehicle based on the satellite signals received from GNSS satellites. In some embodiments, the system 2100 can also include an optional position correction system 2130. The position correction system 2130 may include an antenna 2132 and a receiver 2134 for receiving correction data from a reference station or a network of reference stations. For example, the position correction system 2130 may include a differential global positioning system (DGPS). The correction data may be used by the GNSS receiver 2110 to determine a more precise position of the vehicle (e.g., to millimeter or sub-millimeter accuracies). In some embodiments, the GNSS receiver 2110 may be an independent unit separate from the system 2100.

The system 2100 can include other sensors 2140. For example, the other sensors 2140 may include LiDAR sensors for obstacle detection, inertial measurement units or IMUs (e.g., accelerometers and gyroscopes), wheel angle sensors, and the like.

The system 2160 can include a vehicle controller 2160. The vehicle controller 2160 may be configured to operate the vehicle based on the sensor data (e.g., including GNSS data and other sensor data) and the trajectories determined by the area coverage planning module 2180. For example, the area coverage planning module 2180 can output a coverage trajectory and/or a replenishment trajectory, along with a velocity profile, to the vehicle controller 2160, so that the vehicle controller 2160 can cause the autonomous vehicle to follow the coverage trajectory and/or the replenishment trajectory. The velocity profile includes a respective speed for each respective point along the coverage trajectory and/or the replenishment trajectory.

In some embodiments, the various components of the system 2100 may be interconnected with each other via a bus 2102. In some other embodiments, the various components may be connected with each other in other ways.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of area coverage planning with replenishment planning for an autonomous vehicle that spreads a material in a work area, the method comprising, at a computer system:

receiving information of a boundary of the work area;

receiving information of a headland of the work area, wherein the headland has a headland boundary, wherein the headland is characterized by a headland guideline that is inside the headland and offset by a distance from the headland boundary;

receiving location information of one or more refill stations for replenishing the material;

receiving information of a current amount of the material left in the autonomous vehicle;

based on the information of the boundary of the work area, laying a plurality of tracks within the boundary of the work area so as to minimize a total distance of the plurality of tracks, the plurality of tracks being spaced apart from each other by a spacing;

associating each of the plurality of tracks and the headland guideline with a respective unit cost;

based on the information of the boundary of the work area, the information of the headland of the work area, and the respective unit cost, determining an entry route that extends from a current vehicle location to one of the plurality of tracks along the headland guideline;

generating a coverage trajectory that covers the entry route and is traversable by the autonomous vehicle to traverse the plurality of tracks;

based on (i) the coverage trajectory, (ii) the location information of the one or more refill stations, (iii) the current amount of the material left in the autonomous vehicle, and (iv) a nominal full amount and a nominal consumption rate of the material by the autonomous vehicle, determining one or more logistic points along the coverage trajectory at which a remaining amount of the material reaches a threshold, wherein each of the one or more logistic points is located on a respective track, and the respective track is one of the plurality of tracks laid within the boundary of the work area; and for each respective logistic point of the one or more logistic points, generating a respective replenishment trajectory for the autonomous vehicle, the respective replenishment trajectory comprising:

a first part from the respective logistic point to a respective refill station of the one or more refill stations for replenishing the autonomous vehicle with the material, wherein the first part comprises a path extending from the respective logistic point to an end of the respective track, wherein the autonomous vehicle completes the path before reaching the respective refill station; and a second part from the respective refill station to the respective logistic point for the autonomous vehicle to resume traversing the coverage trajectory.

2. The method of claim 1, wherein laying the plurality of tracks comprises:
performing a multivariate optimization to: (i) determine an optimal direction of the plurality of tracks, and (ii) an optimal offset for a first track from the boundary, so as to minimize the total distance of the plurality of tracks.

3. The method of claim 2, wherein the boundary has an irregular shape, and at least one track of the plurality of tracks intercepts the boundary, thereby being divided into two or more segments.

4. The method of claim 3, wherein the multivariate optimization is performed to further minimize a total number of segments among the plurality of tracks.

5. The method of claim 2, further comprising, at the computer system, receiving information of one or more obstacles located within the work area, wherein:
if a respective track of the plurality of tracks intercepts the boundary or at least one obstacle of the one or more obstacles, the respective track is divided into two or more segments; and
the multivariate optimization is performed further based on the information of the one or more obstacles, so as to minimizes a total number of segments among the plurality of tracks.

6. The method of claim 1, further comprising generating a velocity profile for the autonomous vehicle along the coverage trajectory.

7. The method of claim 1, further comprising, at the computer system:
receiving a location of an entry point and a location of an exit point;
wherein the coverage trajectory includes an entry route from the location of the entry point to a first track, and an exit route from a last track to the exit point.

8. The method of claim 1, wherein the coverage trajectory traverses the plurality of tracks sequentially or non-sequentially.

9. The method of claim 1, wherein the spacing between adjacent tracks of the plurality of tracks is related to a width of an implement attached to the autonomous vehicle.

10. A method of area coverage planning with replenishment planning for an autonomous vehicle that spreads a material in a work area, the method comprising, at a computer system:
receiving information of a boundary of the work area;
receiving information of a headland of the work area, wherein the headland has a headland boundary, wherein the headland is characterized by a headland guideline that is inside the headland and offset by a distance from the headland boundary;
receiving location information of one or more refill stations for replenishing the material;
receiving information of a current amount of the material left in the autonomous vehicle and a current position of the autonomous vehicle;
based on the information of the boundary of the work area, laying a plurality of tracks within the boundary of the work area so as to minimize a total distance of the plurality of tracks, the plurality of tracks being spaced apart from each other by a spacing;
associating each of the plurality of tracks and the headland guideline with a respective unit cost;
based on the information of the boundary of the work area, the information of the headland of the work area, and the respective unit cost, determining an entry route that extends from a current vehicle location to one of the plurality of tracks along the headland guideline;
generating a coverage trajectory that covers the entry route and is traversable by the autonomous vehicle to traverse the plurality of tracks;
based on (i) the coverage trajectory, (ii) the location information of the one or more refill stations, (iii) the current amount of the material left in the autonomous vehicle, and (iv) a nominal full amount and a nominal consumption rate of the material by the autonomous vehicle, determining one or more logistic points along the coverage trajectory at which the autonomous vehicle needs to be replenished with the material, each respective logistic point being at an end of a respective track; and
for each respective logistic point of the one or more logistic points, generating a respective replenishment trajectory for the autonomous vehicle, the respective replenishment trajectory comprising:
a first part from the respective logistic point to a respective refill station of the one or more refill stations for replenishing the autonomous vehicle with the material, wherein the first part comprises a path extending from the current position of the autonomous vehicle to the end of the respective track, wherein the autonomous vehicle completes the path before reaching the respective refill station; and
a second part from the respective refill station to a beginning of a next track for the autonomous vehicle to resume traversing the coverage trajectory.

11. The method of claim 10, wherein laying the plurality of tracks comprises:
performing a multivariate optimization to: (i) determine an optimal direction of the plurality of tracks, and (ii) an optimal offset for a first track from the boundary, so as to minimize the total distance of the plurality of tracks.

12. The method of claim 11, wherein the boundary has an irregular shape, and at least one track of the plurality of tracks intercepts the boundary, thereby being divided into two or more segments.

13. The method of claim 12, wherein the multivariate optimization is performed to further minimize a total number of segments among the plurality of tracks.

14. The method of claim 11, further comprising, at the computer system, receiving information of one or more obstacles located within the work area, wherein:
if a respective track of the plurality of tracks intercepts the boundary or at least one obstacle of the one or more obstacles, the respective track is divided into two or more segments; and
the multivariate optimization is performed further based on the information of the one or more obstacles, so as to minimize a total number of segments among the plurality of tracks.

15. The method of claim 10, further comprising generating a velocity profile for the autonomous vehicle along the coverage trajectory.

16. The method of claim 10, further comprising, at the computer system:
receiving a location of an entry point and a location of an exit point;

wherein the coverage trajectory includes an entry route from the location of the entry point to a first track, and an exit route from a last track to the exit point.

17. The method of claim 10, wherein the coverage trajectory traverses the plurality of tracks sequentially or non-sequentially.

18. The method of claim 10, wherein the spacing between adjacent tracks of the plurality of tracks is related to a width of an implement attached to the autonomous vehicle.

* * * * *